United States Patent
Yamamoto et al.

(10) Patent No.: US 7,830,769 B2
(45) Date of Patent: Nov. 9, 2010

(54) RECORDING APPARATUS AND RECORDING METHOD

(75) Inventors: Masaaki Yamamoto, Tokyo (JP); Kenji Yorimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 338 days.

(21) Appl. No.: 12/127,368

(22) Filed: May 27, 2008

(65) Prior Publication Data

US 2008/0304378 A1 Dec. 11, 2008

(30) Foreign Application Priority Data

Jun. 11, 2007 (JP) ............................. 2007-153875

(51) Int. Cl.
*G11B 7/0045* (2006.01)
(52) U.S. Cl. .................................. 369/59.25
(58) Field of Classification Search ........................ None
See application file for complete search history.

(56) References Cited

U.S. PATENT DOCUMENTS

| | | | |
|---|---|---|---|
| 6,778,481 B2* | 8/2004 | Seo | 369/53.18 |
| 6,956,798 B2* | 10/2005 | Mitsuda et al. | 369/47.13 |
| 7,016,293 B2* | 3/2006 | Lee | 369/275.3 |
| 7,583,575 B2* | 9/2009 | Hwang et al. | 369/53.17 |
| 2002/0064112 A1* | 5/2002 | Seo | 369/53.18 |
| 2002/0105862 A1* | 8/2002 | Lee | 369/30.05 |
| 2002/0105863 A1* | 8/2002 | Lee | 369/30.05 |
| 2003/0172230 A1* | 9/2003 | Sasaki et al. | 711/112 |
| 2004/0013059 A1* | 1/2004 | Sasaki et al. | 369/47.12 |
| 2004/0033054 A1 | 2/2004 | Haino et al. | |
| 2004/0208098 A1* | 10/2004 | Hwang et al. | 369/53.17 |
| 2005/0047294 A1 | 3/2005 | Park | |
| 2005/0055500 A1* | 3/2005 | Park | 711/112 |
| 2006/0044979 A1 | 3/2006 | Kuraoka et al. | |
| 2006/0087943 A1 | 4/2006 | Kuraoka et al. | |
| 2008/0304378 A1* | 12/2008 | Yamamoto et al. | 369/47.14 |

FOREIGN PATENT DOCUMENTS

| | | |
|---|---|---|
| EP | 1 662 505 A1 | 5/2006 |
| JP | 2006-85859 | 3/2006 |
| JP | 2006-114107 | 4/2006 |
| WO | WO 2005/073971 A2 | 8/2005 |

* cited by examiner

*Primary Examiner*—Peter Vincent Agustin
(74) *Attorney, Agent, or Firm*—Oblon, Spivak, McClelland, Maier & Neustadt, L.L.P.

(57) ABSTRACT

A recording apparatus that performs at least recording on a recording medium including a user-data recording area, a first temporary-management-information recording area, one or plural second temporary-management-information recording areas, and area-use-state presenting areas includes a recording unit that performs the recording on the recording medium and a controlling unit that controls the recording unit. The controlling unit determines whether information recording is successful and controls, when it is determined that the information recording fails, the recording unit to record temporary management information in the second temporary-management-information recording area in which temporary management information should be recorded following the second temporary-management-information recording area corresponding to the area-use-state presenting area in which the information recording fails, and, then, perform information recording in the area-use-state presenting area associated with the second temporary-management-information recording area.

8 Claims, 26 Drawing Sheets

FIG. 3

DMA

| CLUSTER NUMBER | CONTENTS | NUMBER OF CLUSTERS |
|---|---|---|
| 1–4 | DDS (REPEAT THE SAME FOUR TIMES) | 4 |
| 5–8 | DFL #1 | 4 |
| 9–12 | DFL #2 (SAME AS #1) | 4 |
| 13–16 | DFL #3 (SAME AS #1) | 4 |
| 17–20 | DFL #4 (SAME AS #1) | 4 |
| 21–24 | DFL #5 (SAME AS #1) | 4 |
| 25–28 | DFL #6 (SAME AS #1) | 4 |
| 29–32 | DFL #7 (SAME AS #1) | 4 |

32 CLUSTERS

FIG. 4

DDS (Disc Definition Structure)

| DATA FRAME NUMBER | BYTE POSITION | CONTENTS | NUMBER OF BYTES |
|---|---|---|---|
| 0 | 0 | DDS IDENTIFIER = "DS" | 2 |
| 0 | 2 | DDS FORMAT NUMBER | 1 |
| 0 | 3 | RESERVED (00h) | 1 |
| 0 | 4 | NUMBER OF TIMES OF DDS UPDATE (= LAST TDDS SERIAL NUMBER) | 4 |
| 0 | 8 | RESERVED (00h) | 8 |
| 0 | 16 | START PHYSICAL SECTOR ADDRESS OF Drive Area IN DMA | 4 |
| 0 | 20 | RESERVED (00h) | 4 |
| 0 | 24 | START PHYSICAL SECTOR ADDRESS OF Defect List IN DMA | 4 |
| 0 | 28 | RESERVED (00h) | 4 |
| 0 | 32 | START PHYSICAL SECTOR ADDRESS OF USER DATA AREA | 4 |
| 0 | 36 | END LOGICAL SECTOR ADDRESS OF USER DATA AREA | 4 |
| 0 | 40 | SIZE OF INNER CIRCUMFERENTIAL SIDE FIRST LAYER REPLACEMENT AREA (ISA0) | 4 |
| 0 | 44 | SIZE OF OUTER CIRCUMFERENTIAL SIDE REPLACEMENT AREA (OSA0, OSA1) | 4 |
| 0 | 48 | SIZE OF INNER CIRCUMFERENTIAL SIDE SECOND LAYER REPLACEMENT AREA (ISA1) | 4 |
| 0 | 52 | REPLACEMENT AREA USABLE FLAG | 1 |
| 0 | 53 | RESERVED (00h) | 1 |
| 0 | 54 | DISK CERTIFICATION FLAG | 1 |
| 0 | 55 | RESERVED (00h) | 1 |
| 0 | 56 | LAST VERIFIED ADDRESS POINTER | 4 |
| 0 ... 31 | 60 ... 2047 | RESERVED (00h) | |

1 CLUSTER (32 SECTORS (32 FRAMES))
1 SECTOR (2048 BYTES)

TDMS Update Unit Layout

FIG. 6A
SRRI + TDDS

| Cluster | Data Frame | Contents |
|---|---|---|
| One Cluster | 0 ~ (30−M) | Set to 00h |
| | (31−M) ~ 30 | SRRI (M sectors) |
| | 31 | TDDS (1 sector) |

FIG. 6B
TDFL + TDDS

| Cluster | Data Frame | Contents |
|---|---|---|
| 0 | 0 ~ 31 | TDFL (N sectors) |
| ⋮ | | |
| K | 0 ~ (x−1) | |
| | x ~ 30 | Set to 00h |
| | 31 | TDDS (1 sector) |

FIG. 6C
TDFL + SRRI + TDDS

| Cluster | Data Frame | Contents |
|---|---|---|
| 0 | 0 ~ 31 | TDFL (N sectors) |
| ⋮ | | |
| K−1 | 0 ~ (x−1) | |
| | x ~ 31 | |
| K | 0 ~ (30−M) | Set to 00h (<31 sectors) |
| | (31−M) ~ 30 | SRRI (M sectors) |
| | 31 | TDDS (1 sector) |

$\begin{bmatrix} K : \text{Number of Cluster} \\ x : \text{mod}(N/32)-1 \end{bmatrix}$ TDMS Layout

FIG. 8

TDDS (Temporary Disc Definition Structure)

| Data Frame | Byte position in Data Frame | Contents | number of bytes |
|---|---|---|---|
| 31 | 0~1 | TDDS identifier = "DS" | 2 |
| 31 | 2 | TDDS format = 00h | 1 |
| 31 | 3 | reserved and set to 00h | 1 |
| 31 | 4~7 | TDDS Update Count | 4 |
| 31 | 8~15 | reserved and set to 00h | 8 |
| 31 | 16~19 | first PSN of Drive Area (P_DA) | 4 |
| 31 | 20~23 | reserved and set to 00h | 4 |
| 31 | 24~27 | first PSN of Defect List (P_DFL) | 4 |
| 31 | 28~31 | reserved and set to 00h | 4 |
| 31 | 32~35 | Location of LSN 0 of User Data Area | 4 |
| 31 | 36~39 | last LSN of User Data Area | 4 |
| 31 | 40~43 | Inner Spare Area 0 size (ISA0 size) | 4 |
| 31 | 44~47 | Outer Spare Area size (OSA size) | 4 |
| 31 | 48~51 | Inner Spare Area 1 size (ISA1 size) | 4 |
| 31 | 52 | Spare Area Full flags | 1 |
| 31 | 53~55 | reserved and set to 00h | 3 |
| 31 | 56 | Pre-write Area flags | 1 |
| 31 | 57~63 | reserved and set to 00h | 7 |
| 31 | 64~71 | Status bits of INFO1/PAC1 locations on L0 | 8 |
| 31 | 72~79 | Status bits of INFO2/PAC2 locations on L0 | 8 |
| 31 | 80~87 | Status bits of INFO1/PAC1 locations on L1 | 8 |
| 31 | 88~95 | Status bits of INFO2/PAC2 locations on L1 | 8 |
| 31 | 96~1023 | reserved and set to 00h | 928 |
| 31 | 1024 | Recording Mode | 1 |
| 31 | 1025 | general flag bits | 1 |
| 31 | 1026~1027 | Inconsistency flags | 2 |
| 31 | 1028~1031 | reserved and set to 00h | 4 |
| 31 | 1032~1035 | Last Recorded Address of User Data Area | 4 |
| 31 | 1036~1039 | reserved and set to 00h | 4 |
| 31 | 1040~1043 | Size of TDMA in Inner Spare Area 0 | 4 |
| 31 | 1044~1047 | Size of TDMAs in Outer Spare Area(s) | 4 |
| 31 | 1048~1051 | Size of TDMA in Inner Spare Area 1 | 4 |
| 31 | 1052~1087 | reserved and set to 00h | 36 |

| Data Frame | Byte position in Data Frame | Contents | number of bytes |
|---|---|---|---|
| 31 | 1088~1091 | next available PSN of Test Zone on L0 (P_TZ0) | 4 |
| 31 | 1092~1095 | next available PSN of Test Zone on L1 (P_TZ1) | 4 |
| 31 | 1096~1103 | reserved and set to 00h | 8 |
| 31 | 1104~1107 | next available PSN of Drive Calibration Zone on L0(P_CZ0) | 4 |
| 31 | 1108~1111 | next available PSN of Drive Calibration Zone on L1(P_CZ1) | 4 |
| 31 | 1112~1119 | reserved and set to 00h | 8 |
| 31 | 1120~1123 | first PSN of 1st Cluster of Defect List (P_1stDFL) | 4 |
| 31 | 1124~1127 | first PSN of 2nd Cluster of Defect List (P_2ndDFL) | 4 |
| 31 | 1128~1131 | first PSN of 3rd Cluster of Defect List (P_3rdDFL) | 4 |
| 31 | 1132~1135 | first PSN of 4th Cluster of Defect List (P_4thDFL) | 4 |
| 31 | 1136~1139 | first PSN of 5th Cluster of Defect List (P_5thDFL) | 4 |
| 31 | 1140~1143 | first PSN of 6th Cluster of Defect List (P_6thDFL) | 4 |
| 31 | 1144~1147 | first PSN of 7th Cluster of Defect List (P_7thDFL) | 4 |
| 31 | 1148~1151 | first PSN of 8th Cluster of Defect List (P_8thDFL) | 4 |
| 31 | 1152~1183 | reserved and set to 00h | 32 |
| 31 | 1184~1187 | first PSN of SRRI/SBM for L0 (P_SRRI/P_SBM0) | 4 |
| 31 | 1188~1191 | first PSN of SBM for L1 (P_SBM1) | 4 |
| 31 | 1192~1215 | reserved and set to 00h | 24 |
| 31 | 1216~1219 | next available PSN of ISA0 (P_ISA0) | 4 |
| 31 | 1220~1223 | next available PSN of OSA0 (P_OSA0) | 4 |
| 31 | 1224~1227 | next available PSN of OSA1 (P_OSA1) | 4 |
| 31 | 1228~1231 | next available PSN of ISA1 (P_ISA1) | 4 |
| 31 | 1232~1915 | reserved and set to 00h | 684 |
| 31 | 1916~1919 | Year/Month/Date of recording | 4 |
| 31 | 1920~2047 | drive ID : Manufacturers Name / Additional ID / Unique Serial Number | 48 / 48 / 32 |

FIG. 9

TDFL

| CLUSTER NUMBER/DATA FRAME NUMBER | BYTE POSITION IN DATA FRAME | CONTENTS | NUMBER OF BYTES |
|---|---|---|---|
| 0 / 0 | 0 | Temporary Defect List Header | 64 |
| 0 / 0 | 64 | Temporary List of Defects (LOW Entry / DFL Entry) | N × 8 |
| ... | | ... | |
| m / n | k | Temporary Defect List Terminator | 8 |
| ... | | | |
| m / 31 | k + 8 | RESERVED (00h) | ... |

N : NUMBER OF ENTRIES m : ip ((64+N × 8)/65536)

n : ip (mod((64+N × 8)/65536)/2048)

k : mod (mod((64+N × 8)/65536)/2048)

FIG. 10A

DFL Entry

| byte 0 / bit 7...4 of DFL Entry i | byte 0 / bit 3...0 & byte 1 to 3 of DFL Entry i | byte 4 / bit 7...4 of DFL Entry i | byte 4 / bit 3...0 & byte 5 to 7 of DFL Entry i |
|---|---|---|---|
| $b_{63}$ ..... $b_{60}$ | $b_{59}$ ..... $b_{32}$ | $b_{31}$ ..... $b_{28}$ | $b_{27}$ ..... $b_0$ |
| Status 1 | Original Cluster First PSN | Status 2 | Replacement Cluster First PSN |

DFL ENTRY i (8byte)

FIG. 10B

| Status 1 | Status 2 | Definition |
|---|---|---|
| 0000 | 0000 | NORMAL REPLACEMENT INFORMATION |
| 0001 | 0000 | DEFECT CLUSTER NOT REPLACED |
| 0000 | 0001 | START ADDRESS OF BURST BLOCK REPLACEMENT |
| 0000 | 0010 | END ADDRESS OF BURST BLOCK REPLACEMENT |

Open SRR

Closed SRR

SRRs in Sequential Recording Mode

FIG. 12

SRRI (Sequential Recording Range Information)

| RELATIVE DATA FRAME NUMBER | BYTE POSITION IN DATA FRAME | CONTENTS | NUMBER OF BYTES |
|---|---|---|---|
| 31 − M | 0 | SRRI Header | 64 |
| 31 − M | 64 | List of SRR entries | N_SRR × 8 |
| : | : | : | : |
| : | 64 + (N_SRR × 8) | SRRI Terminator | 8 |
| : 30 | 64 + (N_SRR+1) × 8 | RESERVED (00h) | : |
| (31) | | (TDDS) | |

M : NUMBER OF SECTORS FORMING SRRI
N_SRR : NUMBER OF SRR ENTRIES

FIG. 13A

SRRI Header

| RELATIVE DATA FRAME NUMBER | BYTE POSITION IN DATA FRAME | CONTENTS | NUMBER OF BYTES |
|---|---|---|---|
| 31 – M | 0 | SRRI Identifier = "SR" | 2 |
| 31 – M | 2 | SRRI format = 00h | 1 |
| 31 – M | 3 | Reserved (00h) | 1 |
| 31 – M | 4 | SRRI Update Count | 4 |
| 31 – M | 8 | Reserved (00h) | 4 |
| 31 – M | 12 | Number of SRR Entries | 4 |
| 31 – M | 16 | Number of Open SRRs | 1 |
| 31 – M | 17 | Reserved (00h) | 3 |
| 31 – M | 20 | List of Open SRR numbers | 16 × 2 |
| 31 – M | 52 | Reserved (00h) | 12 |

M : NUMBER OF SECTORS FORMING SRRI

FIG. 13B

List of Open SRR Numbers

| | | | |
|---|---|---|---|
| 31 – M | 20 | 1st Open SRR Number | 2 |
| 31 – M | 22 | 2nd Open SRR Number | 2 |
| 31 – M | ⋮ | ⋮ | ⋮ |
| 31 – M | 50 | 16th Open SRR Number | 2 |

FIG. 14

SRR Entry

| byte 0 / bit 7...4 of SRR Entry i | byte 0 / bit 3...0 & byte 1 to 3 of SRR Entry i | byte 4 / bit 7 of SRR Entry i | byte 4 / bit 6...4 of SRR Entry i | byte 4 / bit 3...0 & byte 5 to 7 of SRR Entry i |
|---|---|---|---|---|
| $b_{63}$ ..... $b_{60}$ | $b_{59}$ ..... $b_{32}$ | $b_{31}$ | $b_{30}$ ..... $b_{28}$ | $b_{27}$ ..... $b_0$ |
| Reserved | Start PSN of the SRR #i | Session Start | Reserved | LRA in the SRR #i |

SRR ENTRY i (8byte)

FIG. 16

TDMA Access Indicator

| Sector 0 | COPY OF LATEST TDDS AT THAT POINT |
|---|---|
| Sector 1 | COPY OF LATEST TDDS AT THAT POINT |
| ⋮ | ⋮ |
| Sector 30 | COPY OF LATEST TDDS AT THAT POINT |
| Sector 31 | COPY OF LATEST TDDS AT THAT POINT |

IN THE CASE WHERE INDICATOR IS RECORDED EARLIER THAN RECORDING OF TDMS

RECORDING APPARATUS AND RECORDING METHOD

CROSS-REFERENCES TO RELATED APPLICATIONS

The present invention contains subject matter related to Japanese Patent Application JP 2007-153875 filed in the Japanese Patent Office on Jun. 11, 2007, the entire contents of which being incorporated herein by reference.

BACKGROUND OF THE INVENTION

1. Field of the Invention

The present invention relates to a recording apparatus that performs at least recording on a recording medium such as an optical disc and a method for the recording apparatus.

2. Description of the Related Art

As a technique for recording and reproducing digital data, for example, there is a data recording technique that uses optical discs (including magneto-optical discs) such as a CD (Compact Disc), an MD (Mini-disc), and a DVD (Digital Versatile Disc) as recording media. Optical disc is a general term of recording media that are discs formed by protecting metal thin plates with plastic and on which laser beams are irradiated to read signals according to changes in reflected light of the laser beams.

The optical discs include read-only optical discs known as a CD, a CD-ROM, a DVD-ROM, and the like and user-data recordable optical discs known as an MD, a CD-R, a CD-RW, a DVD-R, a DVD-RW, a DVD+RW, a DVD-RAM, and the like. In the recordable optical discs, a magneto-optical recording system, a phase-change recording system, a dye-film-change recording system, and the like are used to make it possible to record data. The dye-film-change recording system is also referred to as a write-once recording system. Since data can be recorded only once and may not be able to be rewritten, the dye-film-change recording system is suitable for applications such as data saving. On the other hand, in the magneto-optical recording system and the phase-change recording system, data can be rewritten. Therefore, the magneto-optical recording system and the phase-change recording system are used for various applications including recording of various content data such as music, videos, games, and application programs.

Moreover, in recent years, a high-density optical disc called Blu-ray Disc (registered trademark) has been developed to realize a remarkable increase in capacity.

For example, in this high-density disc, data recording and reproduction are performed under a condition that a laser with a wavelength of 405 nm and an object lens with NA of 0.85 are combined. When a track pitch is 0.32 μm, linear density is 0.12 μm/bit, a data block of 64 KB (kilobyte) is one recording and reproduction unit, and format efficiency is about 82%, a volume of about 23.3 GB (gigabyte) can be recorded on and reproduced from a disc with a diameter of 12 cm.

A write-once disc and are writable disc have been developed even as such a high-density disc.

In a write-once BD-R (Blu-ray Disc Recordable) disc as an example of the blue-ray disc, the recording structure of data and defect information of the disc are managed. Therefore, the disc has TDMSs (Temporary Disc Management Structures) as management information. It is decided to write the TDMSs in TDMAs (Temporary Disc Management Areas) as management information recording areas provided in predetermined positions on the disc. A TDMS written last is an effective TDMS (see, for example, FIGS. 5A to 5D).

Plural TDMAs are provided in a read-in area and a data area on an inner circumference of the disc. Serial numbers are given to the TDMAs in such a manner as TDMAn (n=0, 1, 2, . . . ). It is decided to use the TDMAs in order of numbers such as TDMA0, TDMA1, TDMA2, and the like and continuously record TDMSs in order from the top.

In the BD-R disc, an area in which a TDMA access indicator that indicates which of the TDMAs is effective (i.e., in which of the TDMAs a latest TDMS is written) is written is secured at the top of the TDMA0 (a first temporary-management-information recording area).

In this case, in a state in which the latest TDMS is written in the TDMA0, no information is written on the TDMA access indicator. At a stage when the TDMA0 is exhausted for the update of the TDMS and the TDMS is written in the TDMA1 following the TDMA0, no information is written on a TDMA1 access indicator in order to indicate that latest information is present in the TDMA1. Thereafter, in the same manner, at a stage when the TDMA1 is exhausted for the update of the TDMS and the TDMS is written in the TDMA2, information is written on a TDMA2 access indicator that indicates that latest information is present in the TDMA2.

In FIGS. 5A to 5D, the DMA access indicator at the top indicates whether data is written at the time of finalization of the disc and the disc is finalized.

The TDMA access indicators and the DMA access indicator are introduced in order to reduce disc recognition time.

According to the above explanation, by checking whether information is written on the respective TDMA access indicators, it is possible to check in which of the TDMAs latest information is present. Specifically, when information is written on only the TDMA1 access indicator, since no information is written in the TDMA2, it is possible to correctly recognize the disc by acquiring a latest TDMS from the TDMA1. When information is written on the TDMA2 access indicator as well as on the TDMA1 access indicator, it is possible to correctly recognize the disc by acquiring the latest TDMS from the TDMA2.

When no information is written on the respective TDMA access indicators, latest information is present in the TDMA0 or the disc is a blank disc on which no information is written. In other words, since this explanation is based on the premise that an access indicator corresponding to the TDMA0 is not provided, when no information is written on both the TDMA access indicators, presence or absence of writing in a TDMS writing area of the TDMA0 is actually checked. Then, when it is judged that the TDMS has been written in the TDMS writing area, the latest TDMS is acquired from the TDMA0 to perform disc recognition.

Examples of the related art include JP-A-2006-85859 and JP-A-2006-114107.

SUMMARY OF THE INVENTION

As described above, the TDMA access indicators are important information in correctly performing disc recognition.

However, in the specification of the BD-R under the present situation, processing performed when writing on the TDMA access indicator fails at the time of recording is not specified. Therefore, depending on a drive device, it is conceivable that, even when writing on the TDMA access indicator fails, the TDMA access indicator is left untouched.

When writing on the TDMA access indicator fails in this way, depending on the TDMA access indicator, it is difficult to correctly indicate a TDMA in which the latest TDMS is recorded. In other words, it is difficult to correctly read out latest management information from the disc in this case. Consequently, it is difficult to properly perform disc recognition.

Therefore, it is desirable to propose recovery means for recovery from failure in recording on a TDMA access indicator to prevent a situation in which information recognition concerning a disc is not correctly performed on a reproduction side.

According to a first embodiment of the present invention, there is provided a recording apparatus that performs at least recording on a recording medium including a user-data recording area in which user data can be recorded, a first temporary-management-information recording area in which temporary management information, which should be updated according to the data recording in the user-data recording area, is sequentially recorded, one or plural second temporary-management-information recording areas in which, when the first temporary-management-information recording area is exhausted for update of the temporary management information, the temporary management information is sequentially recorded, and area-use-state presenting areas that are provided in association with the respective second temporary-management-information recording areas and present states of use of the respective second temporary-management-information recording areas according to presence or absence of the information writing. The recording apparatus includes recording means for performing the recording on the recording medium and controlling means for controlling the recording medium.

The controlling means determines, in response to information recording in the area-use-state presenting area, whether the information recording is successful. When it is determined that the information recording fails, the controlling means controls the recording means to record the temporary management information in the second temporary-management-information recording area in which the temporary management information should be recorded following the second temporary-management-information recording area corresponding to the area-use-state presenting area in which the information recording fails and, then, perform information recording in the area-use-state presenting area associated with the second temporary-management-information recording area in which the temporary management information is recorded.

According to a second embodiment of the present invention, there is provided a recording apparatus that performs at least recording on a recording medium including a user-data recording area in which user data can be recorded, a first temporary-management-information recording area in which temporary management information, which should be updated according to the data recording in the user-data recording area, is sequentially recorded, one or plural second temporary-management-information recording areas in which, when the first temporary-management-information recording area is exhausted for update of the temporary management information, the temporary management information is sequentially recorded, and area-use-state presenting areas that are provided in association with the respective second temporary-management-information recording areas and present states of use of the respective second temporary-management-information recording areas according to presence or absence of the information writing. The recording apparatus includes recording means for performing the recording on the recording medium and controlling means for controlling the recording medium.

The controlling means determines, in response to information recording in the area-use-state presenting area, whether the information recording is successful. When it is determined that the information recording fails, the controlling means controls the recording means to perform the information recording in the area-use-state presenting area following the area-use-state presenting area in which the information recording fails. When it is determined that the information recording is successful, the controlling means controls the recording means to record the temporary management information in the second temporary-management-information recording area corresponding to the area-use-state presenting area in which the information recording is successful.

The recording apparatuses according to the embodiments of the present invention perform recording on a recording medium including, like the BD-R disc described above, a user-data recording area in which user data can be recorded, a first temporary-management-information recording area (TDMA0) in which temporary management information (TDMS), which should be updated according to the data recording in the user-data recording area, is sequentially recorded, one or plural second temporary-management-information recording areas (e.g., TDMA1 and subsequent TDMAs) in which, when the first temporary-management-information recording area is exhausted for update of the temporary management information, the temporary management information is sequentially recorded, and area-use-state presenting areas (respective TDMA access indicators) that are provided in association with the respective second temporary-management-information recording areas and present states of use of the respective second temporary-management-information recording areas according to presence or absence of the information writing.

The first embodiment corresponds to the information recording in the area-use-state presenting area after the recording of the management information. When information is written in the area-use-state presenting area later, it is determined whether the information recording in the area-use-state presenting area is successful as described above. When the information recording fails, recording (copying) of the management information in the next second temporary-management-information recording area and information recording in the area-use-state presenting area corresponding to the second temporary-management-information recording area are performed. Then, even when recording in the area-use-state presenting area corresponding to a certain second temporary-management-information recording area (the TDMA access indicator corresponding to a certain TDMA) fails, it is possible to properly indicate that latest management information is present in the next and subsequent second temporary-management-information recording areas (TDMAs).

The second embodiment corresponds to the information recording in the area-use-state presenting area prior to the recording of the management information. When information is written in the area-use-state presenting area earlier in this way, it is determined whether the information recording in the area-use-state presenting area is successful as described above. When the information recording fails, the information recording in the next area-use-state presenting area is performed. When the information recording is successful, recording of the management information in the second temporary-management-information recording area corresponding to the area-use-state presenting area is performed. Then, as in the first embodiment, even when recording in the area-use-state presenting area corresponding to a certain second temporary-management-information recording area fails, it is possible to properly indicate that latest management information is present in the next and subsequent second temporary-management-information recording areas.

As described above, according to the embodiments of the present invention, even when recording in the area-use-state presenting area corresponding to a certain second temporary-management-information recording area fails, it is possible to properly indicate that latest management information is present in the next and subsequent second temporary-management-information recording areas (TDMAs). Consequently, even when recording on a part of the access indicators fails, it is possible to finally properly indicate a TDMA in which latest management information is recorded.

As a result, it is possible to cause a reproduction side to correctly acquire the latest management information and correctly perform information recognition concerning a recording medium.

BRIEF DESCRIPTION OF THE DRAWINGS

FIG. 3 is an explanatory diagram of a DMA of the disc according to the embodiment;

FIG. 4 is an explanatory diagram of a DDS of the disc according to the embodiment;

FIGS. 6A to 6C are explanatory diagrams of TDMS update units according to the embodiment;

FIG. 8 is an explanatory diagram of a TDDS of the disc according to the embodiment;

FIG. 9 is an explanatory diagram of a TDFL of the disc according to the embodiment;

FIGS. 10A and 10B are explanatory diagrams of a DFL entry of the disc according to the embodiment;

FIG. 12 is an explanatory diagram of an SRRI of the disc according to the embodiment;

FIGS. 13A and 13B are explanatory diagrams of an SRRI header of the disc according to the embodiment;

FIG. 14 is an explanatory diagram of an SRR entry of the disc according to the embodiment;

FIG. 16 is a diagram showing the data structure on a TDMA access indicator;

DESCRIPTION OF THE PREFERRED EMBODIMENTS

Embodiments of the present invention will be hereinafter explained according to order described below.
1. Disc structure
2. DMA
3. TDMA
   3-1 TDMA structure and a TDMS update unit
   3-2 TDDS
   3-3 TDFL
   3-4 SRR and SRRI
   3-5 Replacement processing performed by using a replacement area
   3-6 Processing for write-once recording in the next TDMA
4. Structure of a disc driver device
5. Disc recognition processing performed by using an indicator
6. Indicator recording processing in the past
7. Indicator recording processing according to an embodiment of the present invention.

1. Disc Structure

First, an optical disc used in a recording system according to this embodiment is explained. The optical disc can be implemented as a write-once disc in a category of a high-density optical disc system called Blu-ray disc.

An example of physical parameters of a high-density optical disc used in this embodiment is explained.

As a disc size of the optical disc according to this embodiment, a diameter is 120 mm and disc thickness is 1.2 mm. In terms of these points, the optical disc is externally the same as a disc of a CD (Compact Disc) system and a disc of a DVD (Digital Versatile Disc) system.

As a laser for recording and reproduction, a so-called blue laser is used. The height of an optical system is set to NA (e.g., NA=0.85) and a narrow track pitch (e.g., a track pitch=0.32 μm) and a high line density (e.g., a recording line density of 0.12 μm) are realized. Consequently, in a disc having a diameter of 12 cm, about 23 Gbytes to 25 Gbytes is realized as a user data volume in the disc having a diameter of 12 cm.

A so-called dual-layer disc including two recording layers has already been developed. In the dual-layer disc, a user data volume is about 50 Gbytes.

Figure 1:
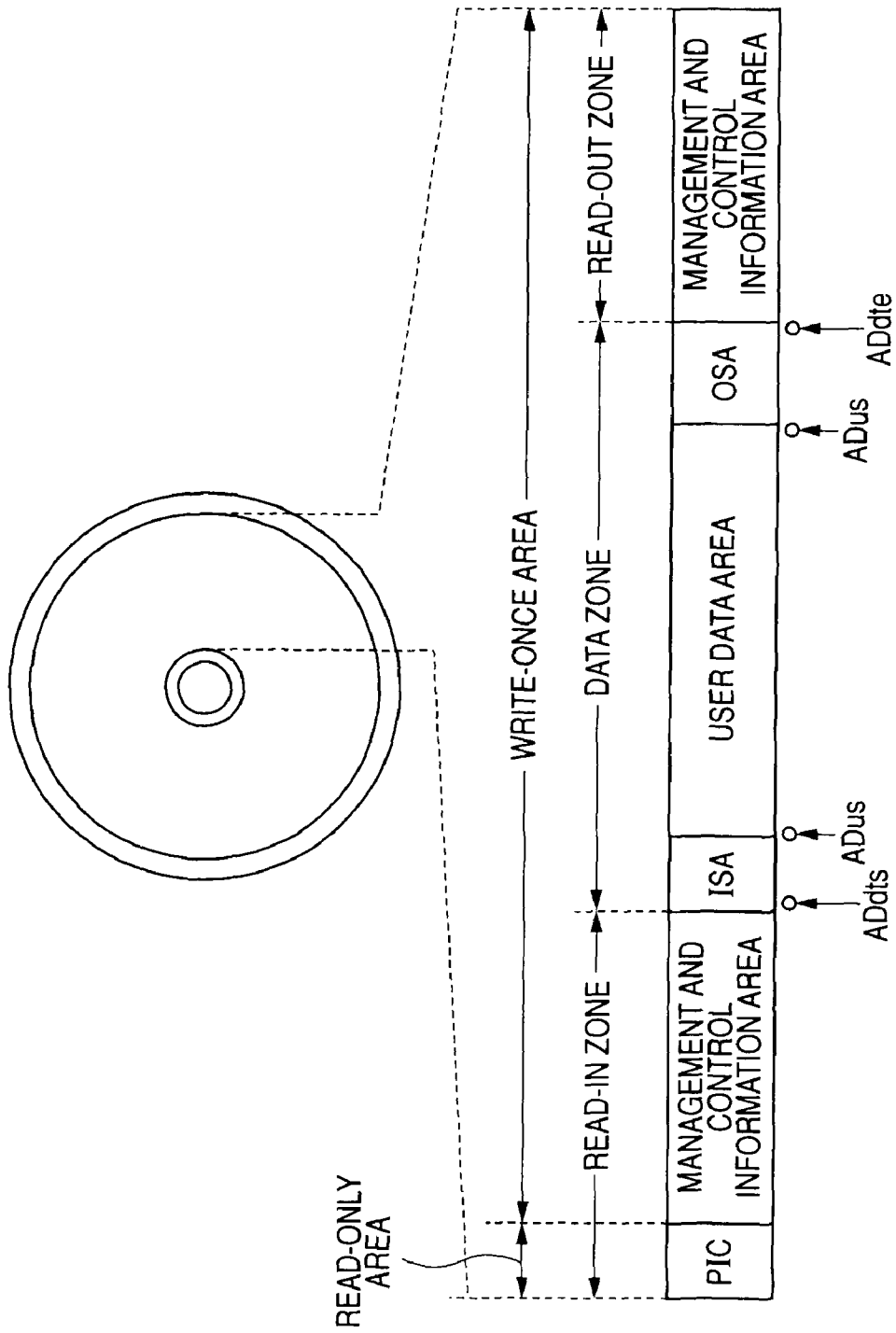
FIG. 1 is an explanatory diagram of the area structure of a disc according to an embodiment of the present invention.

FIG. 1 shows a layout (the area structure) of an entire disc.

In a system according to this embodiment, the layout shown in FIG. 1 is formed by formatting (initialization) processing for the disc. In the following explanation, as an example, an optical disc is a single-layer disc (SL: Single Layer).

As areas on the disc, a read-in zone, a data zone, and read-out zone are arranged from an inner circumferential side of the disc.

In terms of the area structure concerning recording and reproduction, a pre-recorded information area PIC on an innermost circumferential side of the read-in zone is set as a read-only area. An area from a management area of the read-in zone to the read-out zone is set as a write-once area in which recording is possible once.

In the read-only area and the write-once area, recording tracks of wobbling grooves are formed in a spiral shape. The grooves are used as guides of tracking when tracing by a laser spot is performed. Recording and reproduction of data are performed by using the grooves as recording tracks.

In this embodiment, the optical disc in which data is recorded in the grooves is assumed. However, the present invention is not limited to such a groove-recording optical disc. The present invention may be applied to an optical disc of a land recording system in which data is recorded in lands among the grooves. It is also possible to apply the present invention to an optical disc of a land-groove recording system in which data is recorded in grooves and lands.

The grooves used as the recording tracks are formed in a wobbled shape corresponding to a wobble signal. Therefore, in a disc drive device for the optical disc, it is possible to reproduce the wobble signal by detecting both edge positions of a groove from reflected light of a laser spot irradiated on the groove and extracting fluctuation components with respect to a disc radius direction in the both edge positions at the time when the laser spot is moved along the recording tracks.

In the wobble signal, address information (a physical address and other additional information, etc.) of the recording tracks in a recording position of the wobble signal is modulated. Therefore, the disc drive device can perform address control and the like in recording and reproduction of data by demodulating the address information and the like from the wobble signal.

The read-in zone shown in FIG. 1 is an area further on an inner side than, for example, a radius of 24 mm. A radius 22.2 mm to 23.1 mm in the read-in zone is set as the pre-recorded information area PIC.

In the pre-recorded information area PIC, disc information such as a recording and reproduction power condition, area information on the disc, information used for copy protection, and the like are recorded as read-only information in advance by wobbling of the grooves. These kinds of information may be recorded by emboss pits and the like.

Although not shown in the figure, a BCA (Burst Cutting Area) may be provided further on an inner circumferential side than the pre-recorded information area PIC. In the BCA, a unique ID peculiar to a disc recording medium is recorded in a recording system for burst-cutting a recording layer. In order words, a recording data of a barcode shape is formed by forming recording marks to be arranged in a concentric shape.

In the read-in zone, a range having a radius of, for example, 23.1 mm to 24 mm is set as the management and control information area.

In the management and control information area, a predetermined format having a control data area, DMAs (Disc Management Areas), a TDMA0 (TDMA: Temporary Disc Management Area), a test write area (OPC), a buffer area, and the like are set.

In the control data area are in the management and control information area, the following management and control information are recorded: a disc type, a disc size, a disc version, the layer structure, channel bit length, BCA information, a transfer rate, data zone position information, a recording linear velocity, recording and reproduction laser power information, and the like.

The test write area (OPC) also provided in the management and control information area is used for test write or the like in setting data recording and reproduction conditions such as laser power during recording and reproduction. In other words, the test write area (OPC) is an area for adjustment of recording and reproduction conditions.

DMAs are provided in the management and control information area. Usually, the DMAs are called "Defect Management Areas" in the field of disc systems. Replacement management information for defect management is recorded in the DMAs. However, in the disc according to this embodiment, not only the replacement management for defective portions but also management and control information for realizing data rewriting on the write-once disc is recorded in the DMAs. Moreover, an SRRI described later is also recorded. Therefore, the DMAs have a function of "Disc Management Area".

In order to make it possible to perform data rewriting using replacement processing, contents of the replacement management information have to be updated according to the data rewriting. Moreover, management information and the like concerning the recording structure of data have to be updated according to write-once recording. Therefore, areas called TDMA for updating these kinds of management information are provided.

In this case, the management information concerning replacement, the data recording structure, and the like (hereinafter simply referred to as management information as well) is additionally recorded and updated in order from a TDMA0. Although described in detail later, when the TDMA0 is exhausted for update of the management information, it is possible to perform write-once recording in a TDMA1 and a TDMA2 serving as writing areas for further management information (see FIG. 2). Management information recorded in the TDMA last (latest management information) is recorded in the DMAs during finalization of the disc.

The DMAs and the TDMAs are described in detail later.

A range having a radius of, for example, 24.0 mm to 58.0 mm further on an outer circumferential side than the read-in zone is set as a data zone. The data zone is an area in which user data is actually recorded and reproduced. A start address ADdts and an end address ADdte of the data zone are indicated by data zone position information of the control data area.

In the disc according to this embodiment, a replacement area (a spare area) is formed in the data zone. In this case, in the data zone, an ISA (Inner Spare Area) is provided on an innermost circumferential side and an OSA (Outer Spare Area) is provided on an outermost circumferential side thereof. The ISA and the OSA are set as replacement areas used for replacement processing that is performed because of a defect.

The ISA is formed with a cluster size (1 cluster=65536 bytes) of a predetermined number from a start position of the data zone.

The OSA is formed with a cluster size of a predetermined number from an end position of the data zone. The sizes of the ISA and the OSA are described in the DMAs.

A section between the ISA and the OSA in the data zone is set as a user data area. The user data area is a normal recording and reproduction area normally used for recording and reproduction of the user data.

A position, i.e., a start address ADus and an end address ADue of the user data area are described in the DMAs.

In this embodiment, rewriting on an unrewritable write-once medium can be realized by using the replacement processing. In other words, when it is attempted to rewrite data already recorded in a certain block (an area such as a cluster), new data is recorded in another block and managed as replacement management information as in the case of defect replacement to logically realize overwriting. In the case of such rewriting, basically, a block in the user data area is used as a replacement destination.

In FIG. 1, a range having a radius of, for example, 58.0 mm to 58.5 mm further on an outer circumferential side than the data zone is set as a read-out zone. The read-out zone is set as a management and control information area. In the read-out zone, a control data area, DMAs, a buffer area, and the like are formed in predetermined formats. In the control data area, for example, as in the control data area in the read-in zone, various kinds of management and control information are recorded. Like the DMAs in the read-in zone, the DMAs are prepared as areas in which management information of the ISA and the OSA is recorded.

Figure 2:
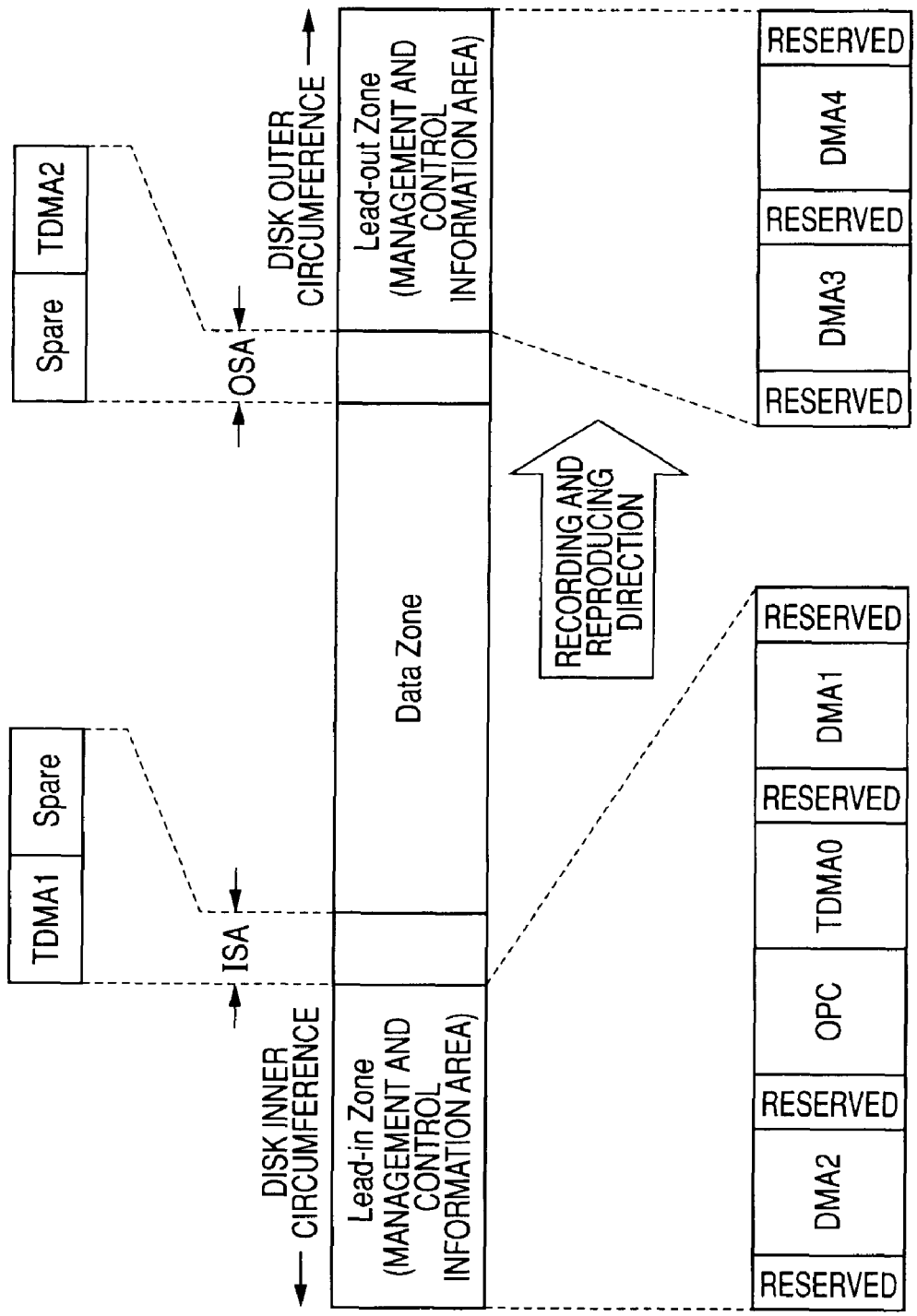
FIG. 2 is an explanatory diagram showing an example of the structure of a management and control information area of the disc according to the embodiment and TDMAs that can be set in a spare area.

An example of the structure of the management and control information area and a TDMA1 and a TDMA2 that can be set in the spare area are shown in FIG. 2.

In the read-in zone excluding an undefined section (a reserved section), as shown in the figure, respective areas of a DMA2, an OPC (a test write area), a TDMA0, and a DMA1 are formed. In the read-out zone excluding an undefined section (a reserved section), respective areas of a DMA3 and a DMA4 are formed.

The control data area is not shown in the figure because, for example, a part of the control data area is the DMAs.

In the spare area, the TDMA1 and the TDMA2 can be provided as shown in the figure. Specifically, the TDMA1 can be set in the ISA and the TDMA2 can be set in the OSA. The TDMA1 and the TDMA2 can be set as an area for recording of new management information when the TDMA0 provided in the read-in zone is exhausted for update of the management information. In other words, when the two areas, the TDMA1 and the TDMA2, are provided as shown in the figure, update of the management information is performed in order of the TDMA0, the TDMA1, and the TDMA2. In this case, in the TDMA1, only a start address thereof is fixed and an end address thereof is variable. In the TDMA2, only an end address thereof is fixed and a start address thereof is variable. In other words, sizes of the TDMA1 and the TDMA2 may be zero.

When the disc is finalized, management information updated last in the TDMAs is written in the DMAs. As described above, the four DMAs are provided in total; the two DMAs in the read-in zone and the two DMAs in the read-out zone. Identical management information is recorded in the DMA1 to DMA4. In other words, the same management information updated last in the TDMAs is recorded in the DMAs. Since a large amount of the same management information is written in this way, it is possible to more surely perform readout of the management information after the finalization.

In summary, the DMAs are not used and replacement management is performed in the TDMAs until the disc is finalized. When the disc is finalized, latest management information recorded in the TDMAs at that point is recorded in the DMAs. Thereafter, replacement management by the DMAs can be performed.

2. DMA

The structure of the DMA recorded in the read-in zone and the read-out zone is shown in FIG. 3. As an example, a size of the DMA is thirty-two clusters. However, the size of the DMA is not limited to thirty-two clusters.

1 cluster is 65536 bytes, which is a minimum unit of data recording. 2048 bytes are a unit called sector (or data frame). Therefore, one cluster is thirty-two sectors (or thirty-two data frames). In terms of a size of user data, the sector and the data frame are identical. However, the sector is a physical data unit and the data frame is a logical data unit.

Addresses are allocated in sector units. A physical sector address is called a PSN (Physical Sector Number) and a logical sector address is called an LSN (Logical Sector Number).

In FIG. 3, respective clusters of the thirty-two clusters are given cluster numbers 1 to 32 to indicate data positions of respective contents in the DMA. Sizes of the respective contents are indicated as the numbers of clusters.

In the DMA, detailed information of the disc is recorded as a DDS (Disc Definition Structure) in a section of the four clusters with the cluster numbers 1 to 4.

Contents of the DDS are described later with reference to FIG. 4. The DDS is a size of one cluster and repeatedly recorded four times in the section of the four clusters.

The section of the four clusters with the cluster numbers 5 to 8 is a first recording area (DFL#1) of a defect list DFL. The defect list DFL is data having a 4 cluster size. In the defect list DFL, respective kinds of replacement address information (a DFL entry and a LOW entry described later) are listed.

A section of the four clusters with the cluster numbers 9 to 12 is a second recording area (DFL#2) of the defect list DFL.

Recording areas of third and subsequent defect lists DFL#3 to DFL#6 are prepared for four clusters, respectively. A section of the four clusters with the cluster numbers 29 to 32 is a seventh recording area (DFL#7) of the defect list DFL.

In other words, seven recording areas of defect lists DFL#1 to DFL#7 are prepared in the DMA with the thirty-two clusters.

In the case of the write-once optical disc that is writable once as in this embodiment, in order to record contents of the DMA, it is necessary to perform processing called finalization. In that case, taking compatibility into account, all the seven defect lists DFL#1 to DFL#7 written in the DMA have the same contents.

The structure of the defect list DFL is substantially the same as that of a TDFL (temporary DFL) in the TDMA described later. Therefore, explanation of the structure is omitted.

Contents of the DDS recorded at the top of the DMA shown in FIG. 3 are shown in FIG. 4.

As described above, the DDS has a size of one cluster (=65536 bytes).

In FIG. 4, as a byte position, a starting byte of the DDS having 65536 bytes is shown as a byte 0. The number of bytes indicates the number of bytes of respective data contents.

In 2 bytes in byte positions 0 to 1, a DDS identifier="DS" for recognizing a cluster of the DDS is recorded.

In 1 byte in a byte position 2, a DDS model number (a version of format) is shown.

In 4 bytes in byte positions 4 to 7, the number of times of update of the DDS (DDS Update Count) is recorded. In this embodiment, management information is written in the DMA during finalization and the DMA itself is not updated. Updating of the management information is performed in the TDMAs. Therefore, when the management information is finalized, the number of times of update of the DDS (TDDS; temporary DDS) performed in the TDMAs is recorded in the byte positions.

In 4 bytes in byte positions 16 to 19, a starting physical sector address of a drive area in the DMA is recorded.

In 4 bytes in byte positions 24 to 27, a starting physical sector address of the defect lists DFL in the DMA is recorded.

4 bytes in byte positions 32 to 35 indicate, with a PSN (Physical Sector Number), a starting position (ADus in FIG.

1) of the user data area in the data zone, i.e., a position of a LSN (Logical Sector Number; logical sector address) "0".

4 bytes in byte positions 36 to 39 indicate, with an LSN (logical sector address), an end position (ADue in FIG. 1) of the user data area in the data zone.

In 4 bytes in byte positions 40 to 43, a size of the ISA in the data zone is shown.

In 4 bytes in byte positions 44 to 47, a size of the OSA per one layer in the data zone is shown.

In 4 bytes in byte positions 48 to 51, a size of the ISA in the data zone (the ISA of a second layer in a dual-layer disc) is shown.

In 1 byte in a byte position 52, a replacement area usability flag (a spare area full flag) indicating whether data rewriting is possible by using the ISA and the OSA is shown. When the ISA or the OSA is entirely used, the replacement area usability flag indicates to that effect.

In 1 byte in a byte position 54, a disc certification flag is shown. The disc certification flag represents a status of authentication of the disc.

In 4 bytes in byte positions 56 to 59, a verified last address is shown as a last verified address pointer.

All byte positions other than the above are indicated as reserved (undefined) and set as 00h.

In the DMA, the management information is recorded in the data structure described above. However, as described above, these kinds of information are recorded in the DMA when the disc is finalized. In that case, latest management information in the TDMAs is reflected on the management information.

Replacement processing for defect management and data rewriting and update of the management information corresponding to the replacement processing are performed in the TDMA explained below.

3. TDMA 3-1 TDMA Structure and a TDMS Update Unit

The TDMA is explained. Like the DMA, the TDMA (temporary DMA) is an area in which the management information is recorded. However, the TDMA is updated when management information is additionally recorded therein when replacement processing corresponding to data rewriting or detection of a defect is performed.

Figures 5A, 5B, 5C, 5D:
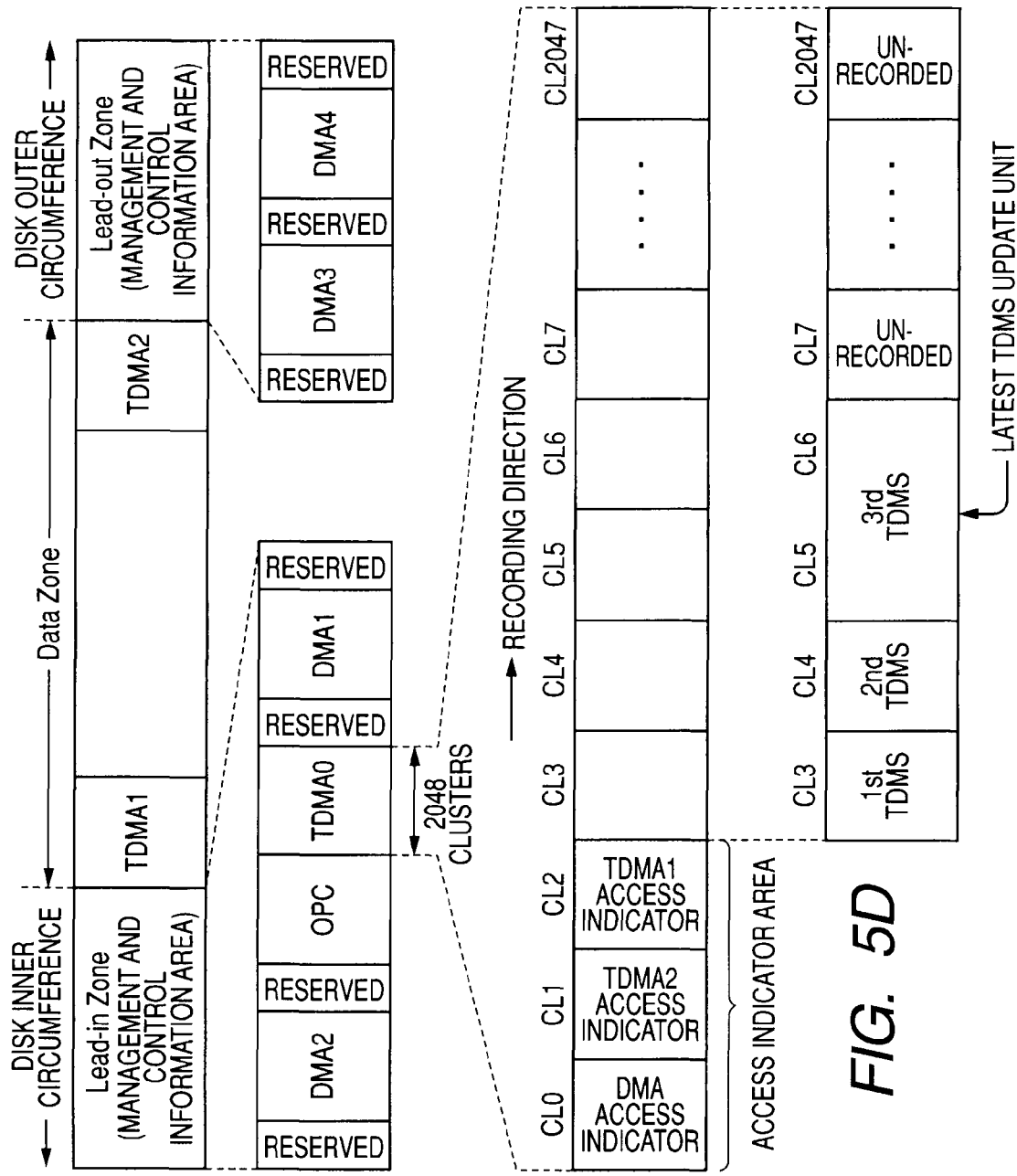
FIGS. 5A to 5D are explanatory diagrams of the structure of a TDMA0 of the disc according to the embodiment.

The structure of the TDMA0 is shown in FIGS. 5A to 5D. As shown in FIGS. 5A and 5B, a size of the TDMA provided in the management and control information area is set to, for example, 2048 clusters. The structure of the TDMA0 in which 2048 clusters are used is shown in FIG. 5C.

Three clusters CL0, CL1, and CL2 from the top of the TDMA0 have a function of an access indicator (an access indicator area).

The cluster CL2 is set as a TDMA1 access indicator and the cluster CL1 is set as a TDMA2 access indicator. The structure including a latest TDDS (Temporary Disc Definition Structure; described later) is recorded in these TDMA access indicators when information is recorded in the TDMAs for the first time. Specifically, when information is recorded in the TDMA1 for the first time, the latest TDDS in the TDMA1 is recorded on the TDMA1 access indicator of the cluster CL2. Similarly, when information is recorded in the TDMA2 for the first time, the latest TDDS in the TDMA2 is recorded on the TDMA2 access indicator of the cluster CL1.

As long as information is updated in the TDMA0, information is not written on the respective TDMA access indicators at all. It is found from this that, when information is not written on both the TDMA1 access indicator and the TDMA2 access indicator, the latest management information is present in the TDMA0 (this does not apply when the disc is a blank disc). According to the above explanation, it is found that, when information is written on the TDMA1 access indicator, the latest management information is present in the TDMA1 and, when information is written on the TDMA2 access indicator, the latest management information is present in the TDMA2.

The cluster CL0 is set as a DMA access indicator. When the DMA is recorded on the DMA access indicator according to finalization, necessary information is acquired from a latest TDMS (Temporary Disc Management Structure; described later) and recorded in a form explained with reference to FIG. 3.

As described above, when information is not written in both the cluster CL1 and the cluster CL2, the latest TDMS can be acquired from the TDMA0. When information is recorded in the cluster CL2, the latest TDMS can be acquired from the TDMA1. When information is recorded in the cluster CL1, the latest TDMS can be acquired from the TDMA2.

When information is recorded on the DMA access indicator serving as the cluster CL10, the disc is finalized and write-inhibited and indicates that latest disc information can be acquired from the DMA.

The DMA access indicator also serves as information indicating whether the disc is finalized according to whether information is written on the DMA access indicator.

The clusters CL3 to CL2047 of the TDMA0 are used for update of the management information as a TDMS writing area.

The structure forming the management information recorded in the cluster CL3 and subsequent clusters is referred to as TDMS (Temporary Disc Management Structure).

TDMSs are additionally recorded in units of a TDMS update unit, which is a variable size of one to N clusters. N is set to "4" in a sequential recording mode. N is set to "8" in the case of the dual-layer disc.

For example, in FIG. 5D, the TDMS update unit of one cluster is recorded in the first cluster CL3, the TDMS update unit of one cluster is recorded in the next cluster CL4, and the TDMS update unit of two clusters is recorded in the cluster CL5.

In this way, the TDMSs are sequentially recorded in the continuous clusters in units of the TDMS update unit when update of the management information is necessary. In recording of the TDMS update unit, a latest TDMS update unit is recorded without a space behind a last recorded cluster at that point.

When a sequential recording mode is set as a recording mode for the write-once disc according to this embodiment, there are three elements forming the TDMS; a TDDS (Temporary Disc Definition Structure), a TDFL (Temporary Defect List), and SRRI (Sequential Recording Range Information). These elements are typically recorded in the same TDMA.

More specifically, information for management of the TDMS is mainly included in the TDDS. Actual replacement information (a LOW entry and a DFL entry) is included in the TDFL. The SRRI is management information of an SRR (Sequential Recording Range) recorded in the user data area. The sequential recording range is equivalent to a "track" in, for example, a CD and a DVD.

The structure of TDMS update units is shown in FIGS. 6A to 6C.

All the TDMS update units include the TDDSs having a size of one sector. The TDDSs are arranged in last sectors (data frames) of clusters forming the TDMS update units.

When TDFLs are included in the TDMS update units, the TDFLs are arranged in a necessary number of sectors (data frames) from the tops of the TDMS update units.

When the SRRI is included in the TDMS update units, the SRRI is arranged on terminal sides of the TDMS update units, i.e., a necessary number of sectors (data frames) immediately before the TDDSs.

FIG. 6A is an example of the TDMS update unit including the SRRI and the TDDS. The TDMS update unit is, for example, one cluster. The TDDS is arranged in a last sector (a data frame 31) of the TDMS update unit. Assuming that a size of the SRRI is M sectors, the SRRI is arranged in M sectors (from data frames (31−M) to the data frame 30) immediately before the TDDS.

In this case, since the TDFL is not recorded, data frames 0 to (30−M) are set to zero data (00h).

FIG. 6B is an example of the TDMS update unit including the TDFL and the TDDS. The TDMS update unit is, for example, K clusters. The TDDS is arranged in a last sector (a data frame 31 of a cluster K). Assuming that a size of the TDFL is N sectors, the TDFL is arranged in N sectors from the top (from a data frame 0 of the cluster 0 to a data frame (x−1) of the cluster K). Note that x=mod(N/32)−1.

In this case, since the SRRI is not recorded, data frames x to 30 of the cluster K are set as zero data (00h).

FIG. 6C is an example of the TDMS update unit including the TDFL, the SRRI, and the TDDS. The TDMS update unit is, for example, K clusters. The TDDS is arranged in a last sector (the data frame 31 of the cluster K). Assuming that a size of the TDFL is N sectors, the TDFL is arranged in N sectors from the top (from the data frame 0 of the cluster 0 to the data frame (x−1) of the cluster (K−1).

The SRRI is arranged in M sectors (from the data frame (31−M) to the data frame 30 of the cluster K) immediately before the TDDS.

If there is a remaining area between the TDFL and the SRRI as shown in the figure, the area is padded with zero data (00h).

It goes without saying that the number of clusters forming the TDMS update unit is different depending on sizes of the TDFL and the SRRI.

Figure 7:
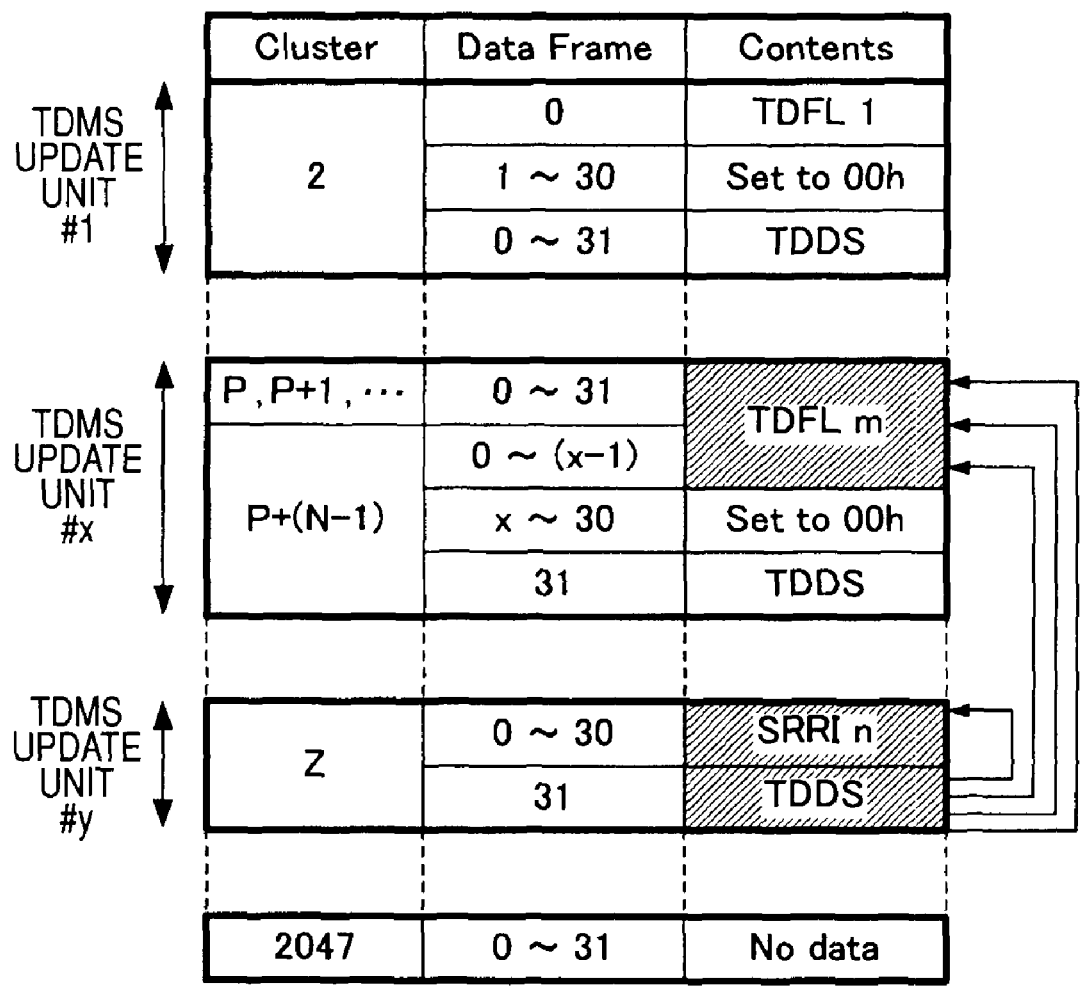
FIG. 7 is an explanatory diagram of writing states of the TDMS update units according to the embodiment.

FIG. 7 shows a state in which the TDMS update units are additionally recorded. For example, first, a TDMS update unit #1 having a two-cluster size is recorded and, then, TDMS update units #2, #3, . . . , #x, . . . , and #y are additionally recorded.

For example, when update of the TDFL is necessary, when update of the SRRI is necessary, or when update of both the TDFL and the SRRI is necessary, the TDMS update units in a necessary form among those shown in FIGS. 6A to 6C are additionally recorded. For example, when update of the SRRI is necessary but update of the TDFL is unnecessary, the form shown in FIG. 6A is used.

In FIG. 7, the TDMS update unit #y is a latest TDMS update unit. The TDDSs are typically included in the TDMS update units. Therefore, the TDDS of the TDMS update unit #y is an effective latest TDDS.

An effective SRRI and an effective TDFL are indicated by the latest TDDS.

The TDMS update unit #y in this embodiment is recorded for update of the SRRI. Therefore, an SRRIn in the TDMS update unit #y is indicated as the effective SRRI by the latest TDDS.

If a TDFLm in the TDMS update unit #x at this point is an effective TDFL, the TDFLm in the TDMS update unit #x is indicated as an effective TDFL by the latest TDDS.

In other words, in the TDMSs additionally recorded whenever necessary in the cluster CL3 and subsequent clusters in the TDMA shown in FIGS. 5A to 5D, a TDDS in a latest TDMS update unit thereof is an effective TDDS. A latest SRRI and a latest TDFL are indicated by the TDDS.

3-2 TDDS

The structure of the TDDS (temporary disc definition structure) recorded as a last sector of the TDMS update unit as described above is shown in FIG. 8.

The TDDS is formed by one sector (2048 bytes). The TDDS includes contents same as those of the DDS in the DMA described in FIG. 4. The DDS is one cluster (65536 bytes). However, as explained with reference to FIG. 4, substantial content definition in the DDS is performed up to a byte position 59 of the data frame 0. In other words, substantial contents are recorded in a top sector (data frame) of one cluster. Therefore, even if the TDDS is one sector, main contents of the DDS contents can be included.

As described above, the TDDS is recorded in the last sector of the last cluster of the TDMS update unit. Therefore, the TDDS is recorded in byte positions 0 to 2047 serving as the data frame 31.

The TDDS has the same contents as the DDS in byte positions 0 to 53. In other words, when the DDS is recorded by finalization, these contents in the latest TDDS is reflected on the DDS and recorded.

In the byte positions up to the byte position 53 of the DDS and the TDDS, "TDDS Update Count" in the byte positions 4 to 7 is the number of times of update of the DDS at it is seen with reference to FIG. 4. However, in the TDDS, this information is a value as the number of times of creation of the TDDS. In the TDDS, "first PSN of Defect List (P_DFL)" (start PSN of a defect list) in the byte positions 24 to 27 takes a value of 0 until disc close processing (processing for prohibiting write-once recording exceeding the number of times) is performed.

In the DDS written in the DMA during the close processing, values in the byte positions 4 to 7 of the latest TDDS during finalization are written in the byte positions 4 to 7 of the DDS. The start PSN of the defect list in the byte position 24 to 27 is written.

In this case, both of byte positions 53 to 55 and byte positions 57 to 63 on both sides of 1 byte of the byte position 56 "Pre-write Area Flags" are padded with 0 as reserved areas. Byte positions 64 to 71 are "Status bits of INF01/PAC locations on L0" and byte positions 72 to 79 are "Status bits of INF01/PAC2 locations on L0". Byte positions 80 to 87 and byte positions 88 to 95 are "Status bits of INF01/PAC1 locations on L1" and "Status bits of INF01/PAC2 locations on L1", respectively. Information effective in the case of the dual-layer disc is written in these areas. Byte positions 96 to 1023 area reserved area.

Information not included in the DDS is recorded in the byte position 1024 and subsequent positions of the TDDS.

1 byte in the byte position 1024 is set in a recording mode and shows a recording mode of the disc. 1 byte in a byte position 1025 and 2 bytes in byte positions 1026 to 1027 are set as general flag bits and inconsistency flags, respectively. 4 bytes in byte positions 1028 to 1031 are a reserved area.

In 4 bytes in byte positions 1032 to 1035, a last data-recorded physical sector address PSN in the user data area is recorded. 4 bytes in byte positions 1036 to 1039 area reserved area.

4 bytes of in byte positions 1040 to 1051 are allocated as recording areas having a size of the TDMA.

In other words, in 4 bytes in byte positions 1040 to 1043, a size of the TDMA in the ISA (Size of TDMA in Inner Spare Area 0), i.e., size information of the TDMS1 is recorded. In 4 bytes in byte positions 1044 to 1047, a size of the TDMA in the OSA (Size of TDMAs in Outer Spare Area(s)), i.e., size information of the TDMA2 is recorded.

In 4 bytes in byte positions 1048 to 1051, size information of the TDMA in the ISA1 (Size of TDMA in Inner Spare Area 1) in the case of the dual-layer disc described later is recorded.

36 bytes in byte positions 1052 to 1087 are a reserved area.

In byte positions 1088 to 1095 and byte positions 1104 to 1111, information concerning a test zone and a calibration zone is recorded, respectively. In other words, byte positions 1088 to 1091 are "next available PSN of Test Zone on L0". Byte positions 1092 to 1095 are "next available PSN of Test Zone on L1". Byte positions 1104 to 1107 are "next available PSN of Drive Calibration Zone on L0" and byte positions 1108 to 1111 are "next available PSN of Drive Calibration Zone L1".

8 bytes in byte positions 1096 to 1103 are a reserved area. 8 bytes in byte positions 1112 to 1119 are also a reserved area.

In 4 bytes in byte positions 1120 to 1123, a starting PSN of a first cluster of the TDFL (First PSN of a 1st Cluster of DFL) is shown.

After this, starting PSNs of second to eighth clusters of the TDFL are shown in every 4 bytes.

The starting PSN of the first cluster of the TDFL to the starting PSN of the first cluster of the TDFL are pointers of the respective TDFLs. An effective TDFL is indicated as shown in FIG. 7 by using the pointers.

32 bytes in byte positions 1152 to 1183 are a reserved area.

In 4 bytes in byte positions 1184 to 1187, a starting PSN of the SRRI (First PSN of SRRI) is shown. The starting PSN of the SRRI is set as a pointer of the SRRI. The effective SRRI is indicated as shown in FIG. 7 by using the pointer.

In 4 bytes in byte positions 1188 to 1191, a starting PSN of the SBM (first PSN of SBM for L1) in the case of the dual-layer disc is shown.

24 bytes in the next byte positions 1192 to 1215 are a reserved area.

In 4 bytes in byte positions 1216 to 1219, an address recorded next in the ISA (Next available PSN of ISA0) is shown.

In 4 bytes in byte positions 1220 to 1223, an address recorded next in the OSA (Next available PSN of OSA0) is shown.

When the ISA or the OSA is used by the replacement processing, a value of the ISA or the OSA is updated as an address in which information is written next.

In 4 bytes in byte positions 1224 to 1227, an address recorded next in the OSA1 (Next available PSN of OSA1) in the case of the dual-layer disc is shown. In 4 bytes in byte positions 1228 to 1231, an address recorded next in the ISA1 in the case of the dual-layer disc is shown.

684 bytes in byte positions 1232 to 1915 are a reserved area.

In 4 bytes in byte positions 1916 to 1919, information concerning year, month, and date when recording is performed (Year/Month/Date of Recording) is shown.

In byte positions 1920 to 2048, a drive ID (Drive ID) is shown. As the drive ID, as shown in the figure, a manufacturer's name (Manufacturers name: 48 bytes), an additional ID (Additional ID: 48 bytes), and a unique serial number (Unique Serial Number: 32 bytes) are recorded.

3-3 TDFL

The structure of the TDFL (temporary DFL) is described. As described above, the TDFL is updated because the TDFL is included in the TDMS update unit.

In FIG. 9, a cluster number/data frame number indicates a cluster number in the TDFL and a sector unit of 2048 bytes. A byte position in a data frame (Byte position in Data frame) indicates a byte position in each of data frames.

As content of the TDFL, 64 bytes from a byte position 0 is set as a TDFL header (Temporary Defect List Header) in which management information of the TDFL is stored.

The TDFL header includes information for recognizing a TDFL cluster, a version, the number of times of TDFL update (TDFL record update), and the number of entries of a TDFL information block (DFL entry/LOW entry).

Bytes after the byte position 64 are a temporary list of defects (Temporary list of Defects) including plural information blocks. A size of each of the information blocks is 8 bytes. When N information blocks are present, a size of the information blocks is N×8 bytes.

One information block formed by 8 bytes is one piece of replacement information and is a DFL entry or a LOW entry.

The DFL entry and the LOW entry are substantially the same replacement information. However, for convenience of explanation, it is assumed that the DFL entry is replacement information of a defect area and the LOW (Logical Overwrite) entry is replacement information used for data rewriting.

The DFL entry and the LOW entry may be mixed as information blocks in the temporary list of defects because the entries indicate substantially the same processing (replacement processing).

The temporary list of defects is formed by a collection of plural DFL entries and LOW entries. A maximum total number of the DFL entries and the LOW entries is 32759 in the case of a single-layer disc.

Immediately after the temporary list of defects, a temporary defect list terminator (Temporary Defect List Terminator) is recorded in 8 bytes and indicates that the temporary list of defects is finished. After that, the cluster is padded with 0 to the end thereof.

The structure of the 8-byte DFL entry, which is each of the information blocks, is shown in FIG. 10A. The same format is used in the case of the LOW entry.

4 bits b63 to b60 among the 8 bytes (=64 bits) are set as a status 1.

28 bits b59 to b32 are set as a replacement source address (a starting PSN of a replacement source cluster).

4 bits b31 to b28 are set as a status 2.

28 bits b27 to b0 are set as a replacement source address (a starting PSN of a replacement destination cluster).

Meaning of the statuses 1 and 2 are shown in FIG. 10B.

When the statuses 1 and 2 are set as "0000" and "0000", the DFL entry (or the LOW entry) of the statuses 1 and 2 is normal replacement information.

Replacement processing for one cluster is indicated by the replacement source address and the replacement destination address recorded in the entry. In other words, replacement processing based on defect detection or replacement processing for data rewriting is entered.

In the case of the DFL entry indicating defect replacement, the replacement destination address is an address in the replacement areas (the ISA and the OSA) shown in FIG. 1.

In the case of the LOW entry by the replacement processing for data rewriting, the replacement destination address is an address selected in the user data area. However, areas in the ISA and the OSA may be used as a replacement destination in this case.

When the statuses 1 and 2 are set as "0001" and "0000", the DFL entry of the statuses 1 and 2 indicates a defect cluster not subjected to replacement processing.

Even when a defect cluster is found during data writing, replacement processing may not be able to be performed by using the ISA and the OSA. In such a case, the replacement processing is not performed. However, the defect cluster is registered as one DFL entry.

In the DFL entry, the statuses 1 and 2 are indicated as "0001" and "0000" and the defect cluster is indicated as a replacement source cluster of bits b59 to b32. In this case, since a replacement destination cluster is not present, bits b27 to b0 are set as, for example, zero data.

When the statuses 1 and 2 are set as "0000" and "0001", an entry of the statuses 1 and 2 indicates a start address of burst block replacement.

When the statuses 1 and 2 are set as "0000" and "0010", an entry of the statuses 1 and 2 indicates an end address of the burst block replacement.

The burst block replacement is replacement processing for collectively replacing physically continuous plural clusters.

In the entry with the statuses 1 and 2 of "0000" and "0001", a starting PSN of a starting cluster for plural cluster ranges subjected to replacement processing and a starting PSN of a starting cluster for plural cluster ranges of a replacement destination of the cluster ranges are recorded.

In the entry with the statuses 1 and 2 of "0000" and "00010", a starting PSN of a last cluster for the plural cluster ranges subjected to the replacement processing and a starting PSN of a last cluster for plural cluster ranges at a replacement destination of the cluster ranges are recorded.

The replacement processing for collectively replacing the continuous plural cluster ranges can be managed by using the two entries. In other words, when the physically continuing plural clusters are collectively subjected to replacement management, it is unnecessary to enter all of the plural clusters one by one. Two kinds of replacement information concerning the starting cluster and the last cluster only have to be entered.

The DFL entry and the LOW entry are mixed in the TDFL in the same format. However, when the disc according to this embodiment is inserted in an apparatus that does not have an ability of data rewriting, both the DFL entry and the LOW entry are interpreted as DFL entries and a cluster read during reproduction is normally replaced. Therefore, reproduction compatibility is maintained.

3-4 SRR and SRRI

An SRR (Sequential Recording Range) and an SRRI (Sequential Recording Range Information) are explained.

Figure 11A:
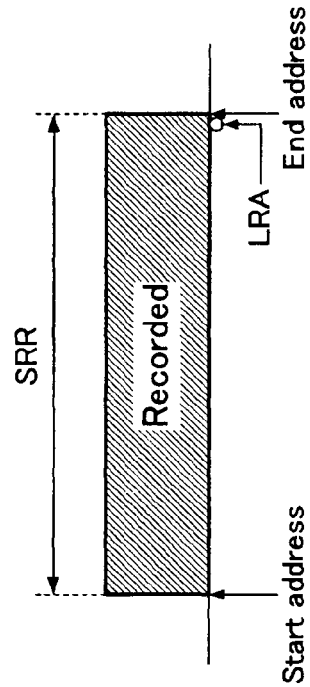
FIGS. 11A to 11C are explanatory diagrams of SRRs of the disc according to the embodiment.
Figure 11B:
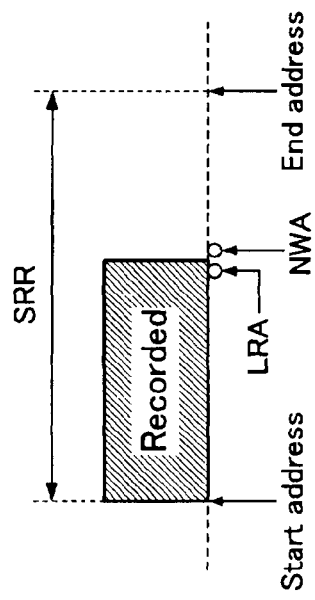
Figure 11C:
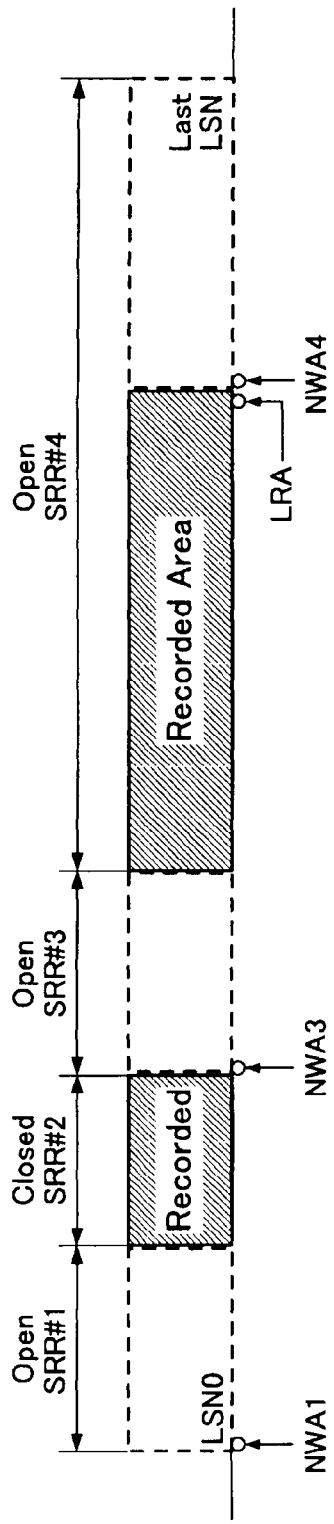

The structure of the SRR is shown in FIGS. 11A to 11C. The SRR is a writing area (a continuous recording range) used in a sequential recording mode for the write-once disc according to this embodiment and has characteristics described in <1> to <5> below similar to those of tracks in a CD.

<1> In the SRR, recording is performed in an address increasing direction. It is possible to have only one recordable address (a write-once point). An address of the write-once point is referred to as an NWA (Next Writable Address; PSN).

As shown in FIG. 11A, when a last recording address in the SRR is represented as an LRA (Last Recorded Address; PSN), the NWA is represented by the following equation:

NWA=($ip$(LRA/32)+1)*32 (when LRA≠0)

NWA=Start PSN of the SRR (when LRA=0)

where ip(N) represents a maximum integer among integers smaller than N.

When recording is performed in the SRR, the NWA is a start address (PSN) of the next cluster of a cluster including the LRA. When recording is not performed in the SRR, the NWA is a start address (PSN) of the SRR.

<2> The SRR takes a status of one of open and closed.

An open SRR shown in FIG. 11A represents a recordable SRR (i.e., having the NWA). A closed SRR shown in FIG. 11B represents an unrecordable SRR (i.e., not having the NWA).

<3> Processing for securing the open SRR on the disc is referred to as reserve of the SRR. Processing for changing the status of the open SRR to closed is referred to as close of the SRR.

<4> Plural (7927 at the maximum) SRRs can be present on the disc. Above all, maximum sixteen open SRRs can be simultaneously present.

<5> SRRs as writing objects can be selected in arbitrary order.

As an actual method of use, the reserve of the Open SRR can be used for recording file data in the disc and, then, recording management information of a file system in a management area while securing the management area for the file system in the front of the file data.

FIG. 11C shows a sample layout of the disc at the time when recording is performed in the sequential recording mode.

On the disc, four SRRs (SRR #1 to SRR #4) are present. The SRR #1, the SRR #3, and the SRR #4 are open SRRs and the SRR #2 is a closed SRR.

When write-once recording is performed on the disc, recording is possible from any one of an NWA1, an NWA3, and an NWA4.

As information for managing such SRRs, an SRRI is recorded by the TDMS update unit.

The structure of the SRRI is shown in FIG. 12.

The SRRI includes sizes of data frames 1 to 31.

A relative data frame number (Relative Data Frame) shown in FIG. 12 indicates respective data frames in a cluster. As described above, the SRRI is arranged immediately before the TDDS recorded in the last data frame 31 of the TDMS update unit. When the SRRI is a size of an M sector, the SRRI is arranged in the data frame (31−M) to the data frame 30. A byte position in a data frame (Byte position in Data frame) indicates a byte position in each of the data frames.

64 bytes from the top of the SRRI are an SRRI header (SRRI Header) for storing management information of the SRRI.

The SRRI header includes information such as information for recognizing an SRRI cluster, a version, the number of times of SRRI update (SRRI record update), and a total number of SRR entries (blocks indicating information of SRRs).

Byte positions after 64 bytes are a list formed by plural SRR entries (List of SRRI Entries).

A size of each of the SRR entries included in the list (List of SRRI Entries) is 8 bytes. When N SRR entries are present, a size of the list is N×8 bytes.

Immediately after a last SRR entry, an 8-byte SRRI terminator (SRRI Terminator) is arranged. After that, the cluster is padded with 0 to the end.

The structure of the SRRI header is shown in FIG. 13A.

2 bytes in byte positions 0 to 1 are an SRRI-ID (SRRI Identifier) for storing management information of the SRRI.

1 byte in a byte position 2 is an SRRI format (SRRI Format) indicating a version of an SRRI format.

4 bytes in byte positions 4 to 7 are an SRRI update count (SRRI Update Count) representing the number of times of update of the SRRI.

4 bytes in byte positions 12 to 15 are the number of SRR entries (Number of SRR Entries) representing a total number of SRR entries.

1 byte in a byte position 16 is the number of open SRRs (Number of Open SRRs) representing a total number of SRRs, statuses of which are open.

From a byte position 20, a list of all Open SRR numbers (List of Open SRR Numbers) is recorded.

The structure of the list (List of Open SRR Numbers) is shown in FIG. 13B. Each of Open SRR numbers has a size of sixteen sets of 2 bytes; 32 bytes in total. When a total number of Open SRRs is less than sixteen, the remaining part of the list (List of Open SRR Numbers) is padded with 0. Every time the total number of Open SRRs increases or decreases, it is necessary to correct contents of the list (List of Open SRR Numbers) and sort the contents in descending order.

The structure of an SRR entry registered subsequent to the SRRI header in an entry list (List of SRRI Entries) shown in FIG. 12 is shown in FIG. 14. An entry number is represented as "i".

SRR entries, each indicating a certain SRR, are formed by 8 bytes (64 bits).

4 bits b63 to b60 are reserved (undefined).

28 bits b59 to b32 are a start address of an SRR #i present in the user data area. In other words, a PSN at the top of a start cluster of the SRR #i is indicated by the 28 bits.

A bit b31 is a session start and is a bit indicating whether this SRR is a first SRR of a session. When the bit is 1, this indicates that the SRR is the first SRR of the session, i.e., the session starts from this SRR.

Three bits b30 to b28 are reserved (undefined).

In 28 bits b27 to b0, an LRA (Last Recorded Address; see FIGS. 11A and 11B) in the SRR #i is indicated by a PSN.

As described above, the number and addresses of the respective SRRs present in the user data area and LRAs of the respective SRRs are managed by the SRRI including the SRRI header and the SRR entries. As described above, an NWA (Next Writable Address) of an open SRR can be calculated from a value of an LRA (Last Recorded Address) in an SRR entry corresponding to the SRR.

Such an SRRI is updated to be included in the TDMS update unit when update of a management state of the SRR is necessary, for example, when the SRR is reserved, when write-once recording is performed from an NWA in the SRR, or when the SRR is closed.

3-5 Replacement Processing Performed by Using a Replacement Area

Replacement processing performed by using fixed replacement areas as an ISA and an OSA is explained.

An ISA (inner spare area: an inner circumferential side replacement area) and an OSA (an outer spare area: an outer circumferential side replacement area) are secured on an inner circumferential side and an outer circumferential side of a data zone as replacement areas for processing for replacing a defective cluster.

Sizes of the ISA and the OSA are defined in the DDS and the TDDS.

The sizes of the ISA and the OSA are determined at the time of initialization and sizes after that are also fixed.

The processing for replacing a defective cluster using the ISA and the OSA is performed as described below.

For example, when data is written according to a request from a host apparatus, a cluster designated as a writing address of the data writing is a defective cluster. Then, it is difficult to perform proper data recording. In that case, data about to be recorded is written in a certain cluster in the ISA or the OSA. This is a replacement processing.

The replacement processing is managed as the DFL entry. In other words, one DFL entry is registered with an address of a defective cluster, in which it is difficult to perform data recording, set as a replacement source and an address of a cluster, in which data is written in the ISA or the OSA, set as a replacement destination.

When there is a request for writing in a recorded address, i.e., data rewriting, as a replacement destination for actually recorded data to be written in a target address, an NWA or the like in the user data area, for example, in the SRR is selected.

In the case of data rewriting, a LOW entry corresponding to replacement for the data rewriting only has to be registered. Replacement of a data position by the data rewriting is managed in the LOW entry in the TDFL in the TDMA. Consequently, even in the write-once disc, it is possible to substantially realize data replacement (from the viewpoint of an OS of a host system, a file system, or the like).

3-6 Processing for Write-Once Recording in the Next TDMA

FIGS. 15A to 15E are diagrams for explaining write-once recording processing in the next TDMA and schematically show a boundary portion of the read-in zone and the data zone and the structure in the TDMA0 provided in the read-in zone. In this case, the TDMA1 is set in the inner spare area.

Figure 15:
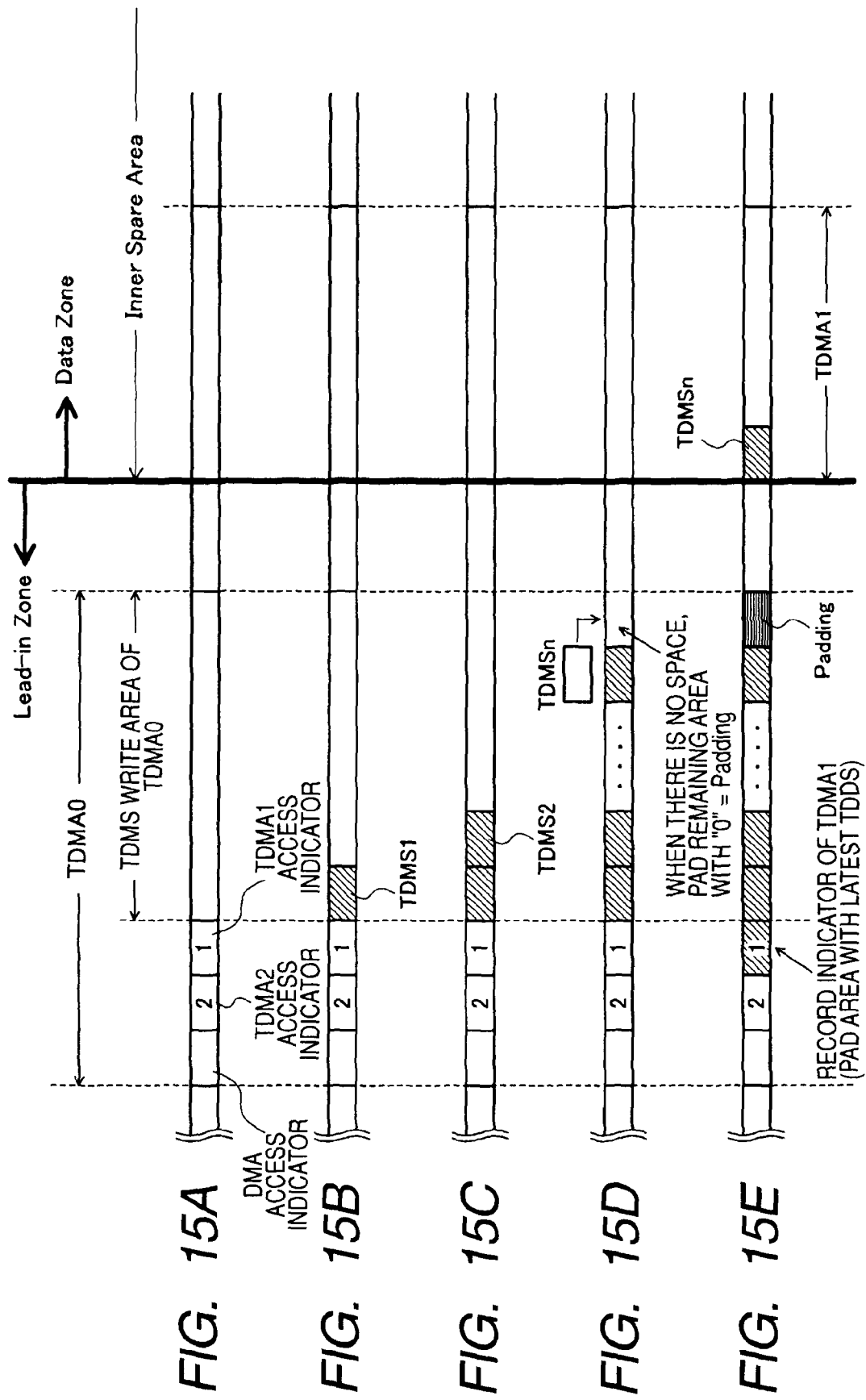
FIGS. 15A to 15E are explanatory diagrams concerning writing processing for writing in the next TDMA.

As described above, the top three clusters of the TDMA0 in the read-in zone are allocated as a recording area of the access indicator. As shown in FIG. 15A, the top cluster CL0 is the DMA access indicator, the next cluster CL1 is the TDMA2 access indicator, and still the next cluster CL2 is the TDMA1 access indicator. In a state shown in FIG. 15A, data is not written in all areas of the TDMA1 access indicator, the TDMA2 access indicator, and the DMA access indicator. Data is not written in the TDMS writing area of the TDMA0. In other words, in FIG. 15A, the disc is a blank disc.

When recording in the user data area is performed several times in the state shown in FIG. 15A, as shown in FIGS. 15B and 15C, the TDMS update units are gradually write-once recorded in order of the TDMS1, the TDMS2, and the like in the TDMS writing area of the TDMA0.

As shown as a transition from FIG. 15A to FIG. 15B and FIG. 15C, as long as write-once recording of the TDMS update units is performed in the TDMA0, information recording is not performed in all the TDMA access indicators. When data is not written on the TDMA access indicators, this indicates that the disc is a blank disc or a latest TDMS is present in the TDMA0.

The TDMSs are gradually write-once recorded as described above and, for example, at the time of write-once recording of the TDMS update unit (write-once recording of the TDMSn) in an Nth time, as shown in FIG. 15D, a spare area in which the TDMSn can be written is not left in the TDMS writing area of the TDMA0.

When an area for write-once recording is not left in this way, write-once recording of the TDMS in a new TDMA is performed.

However, in this case, rather than immediately write-once record the TDMS in the next TDMA1, as shown in FIG. 15E, the remaining area in the TDMS writing area of the TDMA0 is padded. Then, the remaining area of the TDMS writing area of the TDMA0 is padded with 0.

Thereafter, write-once recording of the TDMS (in this case, the TDMSn) in the TDMA1 is performed.

Although not shown in the figure, even if the TDMS is write-once recorded in the TDMA2 anew, when a blank area is left in the TDMA1 before the TDMA2, padding on the area is performed.

When write-once recording of the TDMS in the next TDMA is performed in this way, at the same time, information is recorded on the TDMA access indicator corresponding to the TDMA. When the TDMS is write-once recorded in the TDMA1 for the first time as described above, information is recorded on the TDMA1 access indicator. When the TDMS is write-once recorded in the TDMA2 for the first time, information is recorded on the TDMA2 access indicator.

FIG. 16 shows a data structure on the TDMA access indicator at the time when information recording is performed according to the first write-once recording in the next TDMA. As shown in FIG. 16, as the data structure of the TDMA access indicator, areas for thirty-two sectors in total of the TDMA access indicator are filled with thirty-two copies of a latest TDDS.

In other words, in response to the write-once recording in the TDMA1 in the first time, the TDMA1 access indicator is filled with copies of the TDDS in the TDMS write-once recorded in the TDMA1. Similarly, in response to write-once recording in the TDMA2 in the first time, the TDMA2 access indicator is filled with copies of the TDDS in the TDMS write-once recorded in the TDMA2.

As explained with reference to FIG. 8, information on a size of the TDMA is stored in the TDDS. A start address and an end address of each of the TDMAs can be calculated from the information (a fixed start address of the TDMA1 and an end address of the TDMA2). When the start address and the end address are calculated, by checking a last recorded address between the start address and the end address, a TDDS of a latest TDMS in a TDMA indicated by an access indicator can be obtained. As explained above, the TDDS is written in the last sector in the TDMS.

In this way, the TDMA access indicator has a function for indicating, according to presence or absence of writing, in which TDMA the latest TDMS is present and also has a function for indicating a place of the latest TDDS as described above.

Although not shown in the figure, the DMA access indicator is filled with DDSs generated on the basis of a latest TDDS at a point of finalization of the disc. In other words, the DMA access indicator has a function for indicating, according to presence or absence of writing, whether the disc is finalized and indicating places of the DDSs according to contents of information concerning the finalization of the disc.

4. Structure of a Disc Drive Device

An example of the structure of a disc drive device (a disc drive device 10) corresponding to the write-once disc is explained with reference to FIG. 17.

The disc drive device 10 can form the disc layout in the state explained in FIG. 1 by applying format processing to the write-once disc, for example, a disc in a state in which only the pre-recorded information area PIC shown in FIG. 1 is formed and no data is recorded in the write-once area. The disc drive device 10 records data in and reproduces data from the user data area of such a formatted disc. When necessary, the disc drive device 10 also updates the TDMA.

Figure 17:
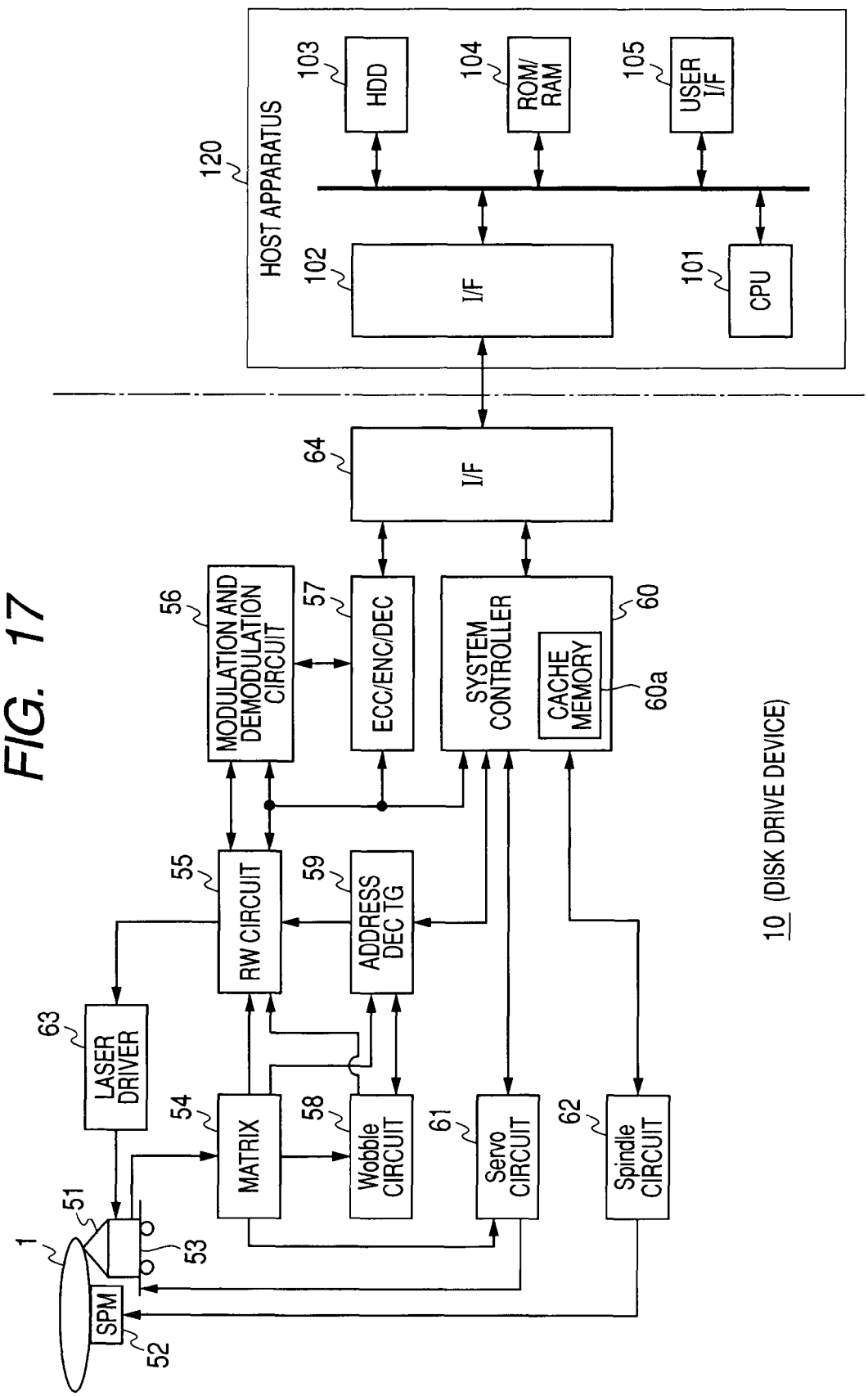
FIG. 17 is a block diagram showing the internal structure of a disc drive device according to the embodiment.

In FIG. 17, a disc 1 inserted in the disc drive device 10 is the write-once disc described above. The disc drive device 10 can also perform recording and reproduction for a rewritable disc and reproduction for a ROM disc.

The disc 1 is placed on a not-shown turntable and driven to rotate at a constant linear velocity (CLV) by a spindle motor 52 during recording and reproduction operations.

An ADIP address and management and control information as pre-recorded information embedded as wobbling of groove tracks on the disc 1 are readout by an optical pickup (an optical head) 51.

During initial format and user data recording, management and control information and user data are recorded in tracks in the write-once area by the optical pickup 51. During reproduction, recorded data is read out by the optical pickup 51.

In the optical pickup 51, a laser diode serving as a laser beam source, a photodetector for detecting reflected light, an object lens serving as an output end of a laser beam, and an optical system (not shown) that irradiates the laser beam on a disc recording surface through the object lens and leads reflected light of the laser beam to the photodetector are formed.

In the optical pickup 51, the object lens is held to be movable in a tracking direction and a focus direction by a biaxial mechanism.

The entire optical pickup 51 is movable in a disc radius direction by a thread mechanism 53.

The laser diode in the optical pickup 51 is driven to emit a laser beam by a drive signal (a drive current) from the laser driver 63.

Reflected light information from the disc 1 is detected by the photodetector in the optical pickup 51, converted into an electric signal corresponding to an amount of received light, and supplied to a matrix circuit 54.

The matrix circuit 54 includes a current-voltage converting circuit and a matrix operation and amplification circuit in association with output currents from plural light receiving elements serving as photodetectors and generates a necessary signal by performing matrix arithmetic processing.

The matrix circuit 54 generates, for example, a high-frequency signal (a reproduced data signal) corresponding to reproduced data, a focus error signal for servo control, and a tracking error signal.

Moreover, the matrix circuit 54 generates a push-pull signal as a signal related to wobbling of the grooves, i.e., a signal for detecting wobbling.

The matrix circuit 54 may be integrally formed in the optical pickup 51.

The reproduced data signal, the focus error signal and the tracking error signal, and the push-pull signal outputted from the matrix circuit 54 are supplied to a reader/writer circuit 55, a servo circuit 61, and a wobble circuit 58, respectively.

The reader/writer circuit 55 applies binarization processing, reproduced clock generation processing by a PLL, and the like to the reproduced data signal, reproduces data read out by the optical pickup 51, and supplies the data to a modulation and demodulation circuit 56.

The modulation and demodulation circuit 56 includes a functional section serving as a decoder for reproduction and a functional section serving as an encoder for recording.

During reproduction, the modulation and demodulation circuit 56 performs, as decode processing, demodulation processing for a run-length limited code on the basis of a reproduced clock.

An ECC encoder/decoder 57 performs ECC encode processing for adding an error correction code during recording and ECC decode processing for performing error correction during reproduction.

During reproduction, the ECC encoder/decoder 57 captures data demodulated by the modulation and demodulation circuit 56 into an internal memory, performs processing such as error detection and correction processing and de-interleaving, and obtains reproduced data.

The data decoded to the reproduced data by the ECC encoder/decoder 57 is read out on the basis of an instruction of a system controller 60 and transferred to a host apparatus 120, for example, a personal computer and an AV (Audio-Visual) apparatus connected via an interface 64.

The push-pull signal outputted from the matrix circuit 54 as a signal related to wobbling of the grooves is processed by the wobble circuit 58. The push-pull signal as ADIP information is demodulated into a data stream forming an ADIP address by the wobble circuit 58 and supplied to an address decoder 59.

The address decoder 59 performs decoding for the supplied data, obtains an address value, and supplies the address value to the system controller 60.

The address decoder 59 generates a clock through PLL processing performed by using a wobble signal supplied from the wobble circuit 58 and supplies the clock to the respective units as, for example, an encode clock for recording.

The push-pull signal outputted from the matrix circuit 54 as the signal related to the wobbling of the grooves is a push-pull signal as pre-recorded information PIC. The push-pull signal is subjected to band-pass filter processing by the wobble circuit 58 and supplied to the reader/writer circuit 55. After being binarized and converted into a data bit stream, the push-pull signal is ECC-decoded and de-interleaved by the ECC encoder/decoder 57 and data as the pre-recorded information is extracted from the push-pull signal. The extracted pre-recorded information is supplied to the system controller 60.

The system controller 60 can perform various kinds of operation setting processing, copy protect processing, and the like on the basis of the read-out pre-recorded information.

During recording, recorded data is transferred from the host apparatus 120. The recorded data is transferred to a memory in the ECC encoder/decoder 57 via the interface 64 and buffered.

In this case, the ECC encoder/decoder 57 performs addition of an error correction code, interleaving, and addition of a sub-code and the like as encode processing for the buffered recorded data. The ECC-encoded data is subjected to modulation of, for example, an RLL (1-7) PP system by the modulation demodulation circuit 56 and supplied to the reader/writer circuit 55.

As an encode clock set as a reference clock for these kinds of encode processing during recording, the clock generated from the wobble signal as described above is used.

The recorded data generated by the encode processing is subjected to, as recording compensation processing, fine control of optimum recording power with respect to a characteristic of a recording layer, a spot shape of a laser beam, a recording liner velocity, and the like, adjustment of a laser drive pulse waveform, and the like by the reader/writer circuit 55 and, then, transmitted to the laser driver 63 as a laser drive pulse.

The laser driver 63 gives the supplied laser driver pulse to the laser diode in the optical pickup 51 and performs laser beam emission driving. Consequently, a pit corresponding to the recorded data is formed in the disc 1.

The laser driver 63 includes a so-called APC circuit (Auto Power control) and controls an output of a laser to be fixed regardless of temperature and the like while monitoring laser output power according to an output of a detector for monitoring laser power provided in the optical pickup 51. Target values of laser outputs during recording and during reproduction are given from the system controller 60. The laser driver 63 controls laser output levels to be the target values during recording and during reproduction.

The servo circuit 61 generates various servo drive signals for focus, tracking, and thread from the focus error signal and the tracking error signal from the matrix circuit 54 and causes the thread mechanism 53 to perform a servo operation.

In other words, the servo circuit 61 generates a focus drive signal and a tracking drive signal according to the focus error signal and the tracking error signal and drives a focus coil and a tracking coil of the biaxial mechanism in the optical pickup 51. Consequently, a tracking servo loop and a focus servo loop is formed by the optical pickup 51, the matrix circuit 54, the servo circuit 61, and the biaxial mechanism.

The servo circuit 61 turns off the tracking servo loop according to a track jump command from the system controller 60 and outputs a jump drive signal to cause the thread mechanism 53 to execute a track jump operation.

The servo circuit 61 generates a thread error signal obtained as a low-frequency component of the tracking error signal and a thread drive signal based on access execution control or the like from the system controller 60 and drives the thread mechanism 53. Although not shown in the figure, the thread mechanism 53 includes a main shaft that holds the optical pickup 51, a thread motor, and a mechanism including a transmission gear. The thread mechanism 53 drives the thread motor according to the thread drive signal, whereby necessary slide movement of the optical pickup 51 is performed.

A spindle servo circuit 62 performs control for CLV-rotating the spindle motor 2.

The spindle servo circuit 62 obtains a clock generated by the PLL processing for the wobble signal as present rotation speed information of the spindle motor 52 and compares the clock with predetermined CLV reference speed information to thereby generate a spindle error signal.

During data reproduction, a reproduction clock (a clock as a reference of decode processing) generated by the PLL in the reader/writer circuit 55 is present rotation speed information of the spindle motor 52. Therefore, the spindle servo circuit 62 can also generate a spindle error signal by comparing the reproduction clock with the predetermined CLV reference speed information.

The spindle servo circuit 62 outputs a spindle drive signal generated according to the spindle error signal and causes the spindle motor 62 to perform CLV rotation.

The spindle servo circuit 62 generates a spindle drive signal according to a spindle kick/brake control signal from the system controller 60 and causes the spindle motor 2 to execute operations such as start, stop, acceleration, and deceleration.

The various operations of the servo system and the recording and reproduction system described above are controlled by the system controller 60 formed by a microcomputer.

The system controller 60 executes various kinds of processing according to commands from the host apparatus 120.

For example, when a write command is outputted from the host apparatus 120, first, the system controller 60 moves the optical pickup 51 to an address in which data should be written. Then, the system controller 60 causes the ECC encoder/decoder 57 and the modulation and demodulation circuit 56 to execute the encode processing as described above on the data (e.g., video data of the MPEG system and audio data) transferred from the host apparatus 120. The laser drive pulse from the reader/writer circuit 55 is supplied to the laser driver 63 as described above, whereby recording is executed.

For example, when a read command requesting transfer of certain data (video data of the MPEG system, etc.) recorded on the disc 1 is supplied from the host apparatus 120, first, the system controller 60 performs seek operation control targeting a designated address. In other words, the system controller 60 issues a command to the servo circuit 61 and causes the servo circuit 61 to execute an access operation of the optical pickup 51 targeting an address designated by a seek command.

Thereafter, the system controller 60 performs operation control necessary for transferring data in the designated data section to the host apparatus 120. In other words, the system controller 60 reads out data from the disc 1, causes the reader/writer circuit 55, the modulation and demodulation circuit 56, and the ECC encoder/decoder 57 to execute decoding, buffering, and the like and transfers the requested data.

During recording and reproduction of these data, the system controller 60 can perform control of access and recording and reproduction operations using an ADIP address detected by the wobble circuit 58 and the address decoder 59.

At a predetermined point such as a point when the disc 1 is inserted, the system controller 60 causes the disc drive device 10 to execute readout of the unique ID recorded in the BCA of the disc 1 (when the BCA is formed) and the pre-recorded information (PIC) recorded in the read-only area as the wobbling grooves.

In that case, first, the system controller 60 performs seek operation control targeting a pre-recorded data zone PR. In other words, the system controller 60 issues a command to the servo circuit 61 and causes the servo circuit 61 to execute an access operation of the optical pickup 51 to a disc innermost circumferential side.

Thereafter, the system controller 60 causes the optical pickup 51 to execute reproduction trace and obtains a push-pull signal as reflected light information. The system controller 60 causes the wobble circuit 58, the reader/writer circuit 55, and the ECC encoder/decoder 57 to execute decode processing and obtains reproduced data as BCA information and pre-recorded information.

The system controller 60 performs laser power setting, copy protect processing, and the like on the basis of the BCA information and the pre-recorded information read out in this way.

In FIG. 17, a cache memory 60a is shown in the system controller 60. The cache memory 60a is used for storing and updating a TTDS, a TDFL, an SRRI, and the like read out from the TDMA of the disc 1.

For example, when the disc 1 not finalized is inserted, the system controller 60 controls the respective units and causes the units to execute readout of the TDDS, the TDFL, and the SRRI recorded in the TDMA and stores read-out information in the cache memory 60a.

Thereafter, when replacement processing due to data writing or rewriting or a defect is performed, the system controller 60 updates the SRRI, the TDFL, and the like in the cache memory 60a.

For example, every time the replacement processing is performed because of data writing, data rewriting, and the like and update of the SRRI or the TDFL is performed, a TDMS update unit may be additionally recorded in the TDMA (or the ATDMA) of the disc 1. However, when such additional recording is performed, the TDMA of the disc 1 is consumed faster.

Therefore, for example, the disc drive device 10 adopts a method of updating, when data write-once recording is performed and the LRA (Last Recorded Address) as the SRRI is updated, the SRRI in the cache memory 60a in advance a certain number of times and recording the SRRI, which is updated in the cache memory at a certain point, on the disc 1 using the TDMS update unit.

For example, it is also conceivable to adopt a method of updating, in a period until the disc 1 is ejected from the disc drive device 10, the TDFL and the SRRI in the cache memory 60a and writing, during ejection or the like, final (latest) TDFL and SRRI in the cache memory 60a in the TDMA of the disc 1.

When the host apparatus 120 is, for example, a personal computer, the host apparatus 120 includes a CPU 101, an interface 102, an HDD 103, a ROM/RAM 104, and a user interface 105.

The interface 102 performs communication of commands and recorded and reproduced data between the host apparatus 120 and the disc driver device 10.

The HDD (hard disc drive) 103 is used for storage of AV data, application programs, and the like.

The ROM/RAM 104 is used for storage of programs started by the CPU 101 and used as a work area of the CPU 101.

The user interface 105 indicates a section or a device for input by a user and output to the user such as a display unit for videos, characters, and the like such as a monitor display, a sound output unit such as a speaker, or an operation input unit such as a keyboard or a switch.

Such a host apparatus 120 is an apparatus that uses the disc drive device 10 as a storage device for AV data in accordance with an application program started by the CPU 101.

As the host apparatus 120, as an embodiment, for example, a video camera, an audio system, an AV editing apparatus, and other various apparatuses are assumed rather than the personal computer.

5. Disc Recognition Processing Performed by Using an Indicator

As explained above, the TDMA1 access indicator and the TDMA2 access indicator are provided in the TDMA0. These TDMA access indicators indicate in which TDMA a latest TDMS is present according to presence or absence of writing on the TDMA access indicators.

In the TDMA access indicators, when a TDMS is recorded in the TDMA associated with the TDMA access indicators for the first time, information on a TDDS in the TDMS is written. It is possible to acquire size information of the TDMAs from the information of the TDDS in such access indicators. It is possible to acquire information on a latest TDDS in a last recorded address in the relevant TDMA by searching for the last recorded address in a range obtained by calculating an address on a variable side (a start or end address) from the size information.

Disc recognition processing for finally acquiring a latest TDDS by checking the access indicators and performing information recognition concerning the disc in this way is explained with reference to a flowchart shown in FIG. 18.

Figure 18:
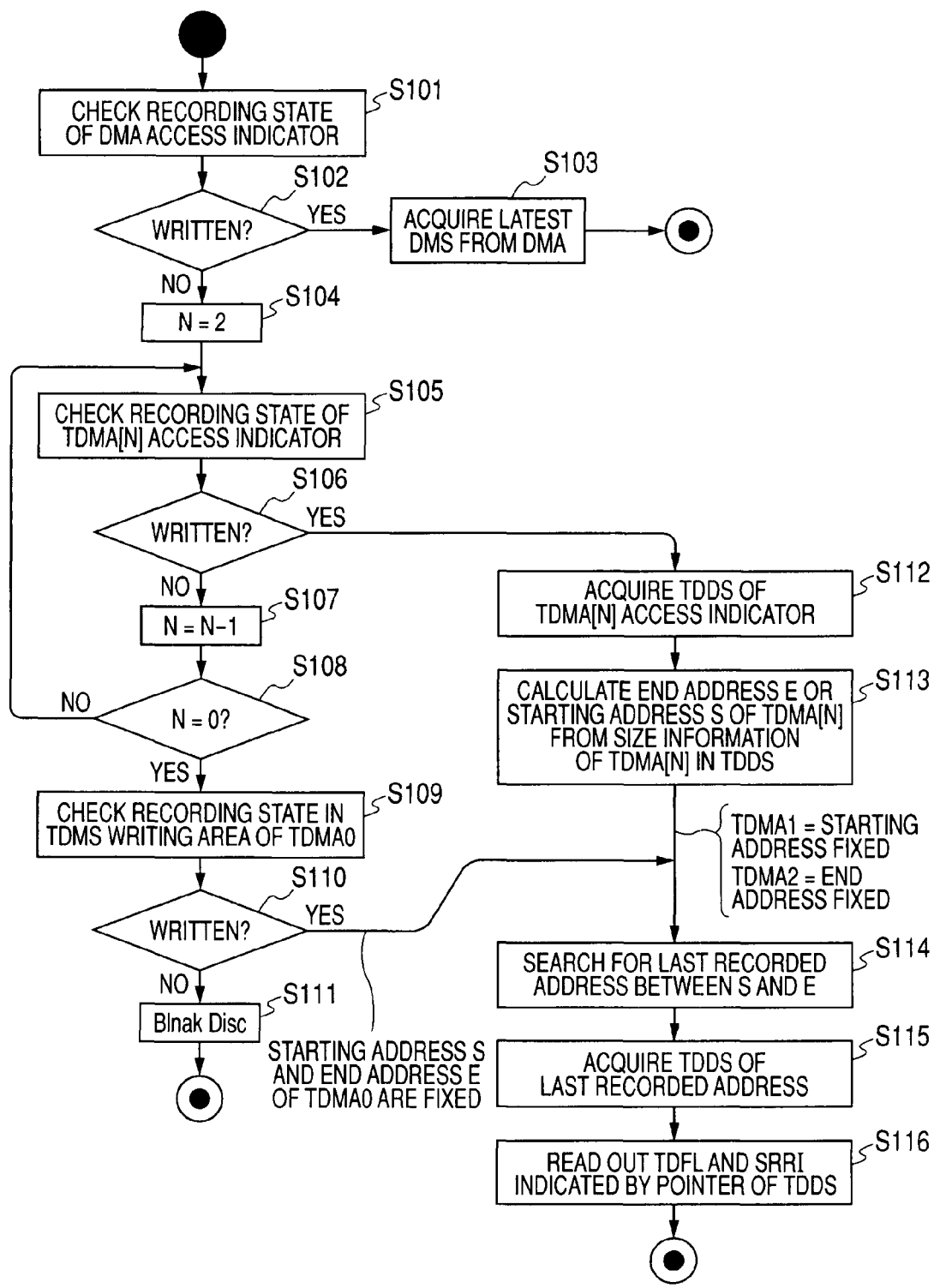
FIG. 18 is a flowchart for explaining disc recognition processing performed by using an indicator.

In FIG. 18, readout for top three clusters (i.e., access indicator areas) of the TDMA0 has already been performed. Readout data concerning this area is cached.

In FIG. 18, first, in step S101, the system controller 60 checks a recording state of the DMA access indicator. In the following step S102, the system controller 60 determines whether information is written on the DMA access indicator. When information is written on the DMA access indicator, it is found that the disc 1 is finalized and a latest DMS is present in the DMA.

When it is determined in step S102 that information is written on the DMA access indicator, the system controller 60 proceeds to step S103 and performs processing for acquiring a latest DMS from the DMA. Consequently the disc recognition processing shown in the figure is completed and the system controller 60 shifts to the next processing.

When it is determined in step S102 that information is not written on the DMA access indicator, in step S104, the system controller 60 sets N to 2. In the following step S105, the system controller 60 checks a recording state of a TDMA [N] access indicator. In step S106, the system controller 60 determines whether information is written on the TDMA [N] access indicator. For example, when N is 2, the system controller 60 determines whether information is written on the TDMA2 access indicator. When a negative result is obtained in step S106, as shown in the figure, in step S107, the system controller 60 decrements N by 1. When it is determined in the following step S108 that N is not 0, the determination processing in steps S105 and S106 is performed again. In this case (when N is 1), the system controller 60 determines whether information is written on the TDMA1 access indicator.

When information is not written on both the TDMA2 access indicator and the TDMA1 access indicator, in step S107, the system controller 60 sets N to 0 and, in step S108, an affirmative result is obtained. When it is determined in step S108 that N is 0 in this way, in step S109, the system controller 60 checks a recording state of the TDMS writing area of the TDMA0. Then, in the next step S110, the system controller 60 determines whether information is written in the TDMS writing area of the TDMA0.

When it is determined in step S110 that information is not written in the TDMS writing area, the system controller 60 proceeds to step S111 and judges that the disc 1 is a blank disc. In this case, since information that should be acquired is not present, the disc recognition processing shown in the figure is completed and the system controller 60 shifts to the next processing.

When it is determined in step S110 that information is written in the TDMS writing area, as shown in the figure, the system controller 60 proceeds to step S114 and searches for a last recorded address between the start address S and the end address E. For confirmation, as described above, the TDMA0 is a fixed area and the start address S and the end address E thereof are also fixed.

In the following step S115, the system controller 60 acquires a TDDS of the last recorded address. In other words, as it is understood from the above explanation, in the TDMA in which the latest TDMS is recorded, a latest TDDS is written in the last recorded address (a last sector). Therefore, the TDDS is acquired.

In the following step S116, the system controller 60 reads out a TDFL and an SRRI indicated by pointers of the TDDS. In other words, the system controller 60 reads out and acquires the TDFL and the SRRI on the basis of the pointer of the TDFL (in the byte positions 1020 to 1151) and the pointer of the SRRI (in the byte positions 1184 to 1187) in the TDDS explained with reference to FIG. 8.

When step S116 is executed, the disc recognition processing shown in the figure is completed and the system controller 60 shifts to the next processing.

When it is determined in step S106 that information is written on the TDMA [N] access indicator, the system controller 60 performs the processing in step S112 and subsequent steps in order to acquire latest information from the TDMA[N].

First, in step S112, the system controller 60 acquires a TDDS in the TDMA [N] access indicator. In the following step S113, the system controller 60 calculates an end address E or a start address S of the TDMA[N] from size information of the TDMA[N] in the acquired TDDS. In other words, in the case of the TDMA1, since the start address S is fixed, the system controller 60 calculates the end address E on the basis of the fixed start address S and size information of the TDMA1 in the TDDS. In the case of the TDMA2, since the end address E is fixed, the system controller 60 calculates the start address S on the basis of the fixed end address E and size information of the TDMA2 in the TDDS.

In this way, the TDMA1 and the TDMA2 having variable area sizes are determined as TDMAs in which the latest TDMS is recorded. In this case, processing for calculating a start address or an end address is performed on the basis of information concerning TDNA sizes stored in the TDDS in the access indicator. As processing for acquiring latest TDFL and SRRI after the start address S and the end address E are calculated in this way, the processing in steps S114 to S116 is executed.

6. Indicator Recording Processing in the Past

As it is understood from the above explanation, the TDMA access indicator is important information in correctly performing disc recognition. However, as described above, in the BD-R specification under the present situation, there is no definition concerning processing performed when writing on the TDMA access indicator fails during recording. Therefore, depending on a drive device, even if writing on the TDMA access indicator fails, the TDMA access indicator may be left untouched.

Specifically, it is assumed that recording on the TDMA access indicator is performed, for example, after a TDMS is recorded in a new TDMA.

Figure 19:
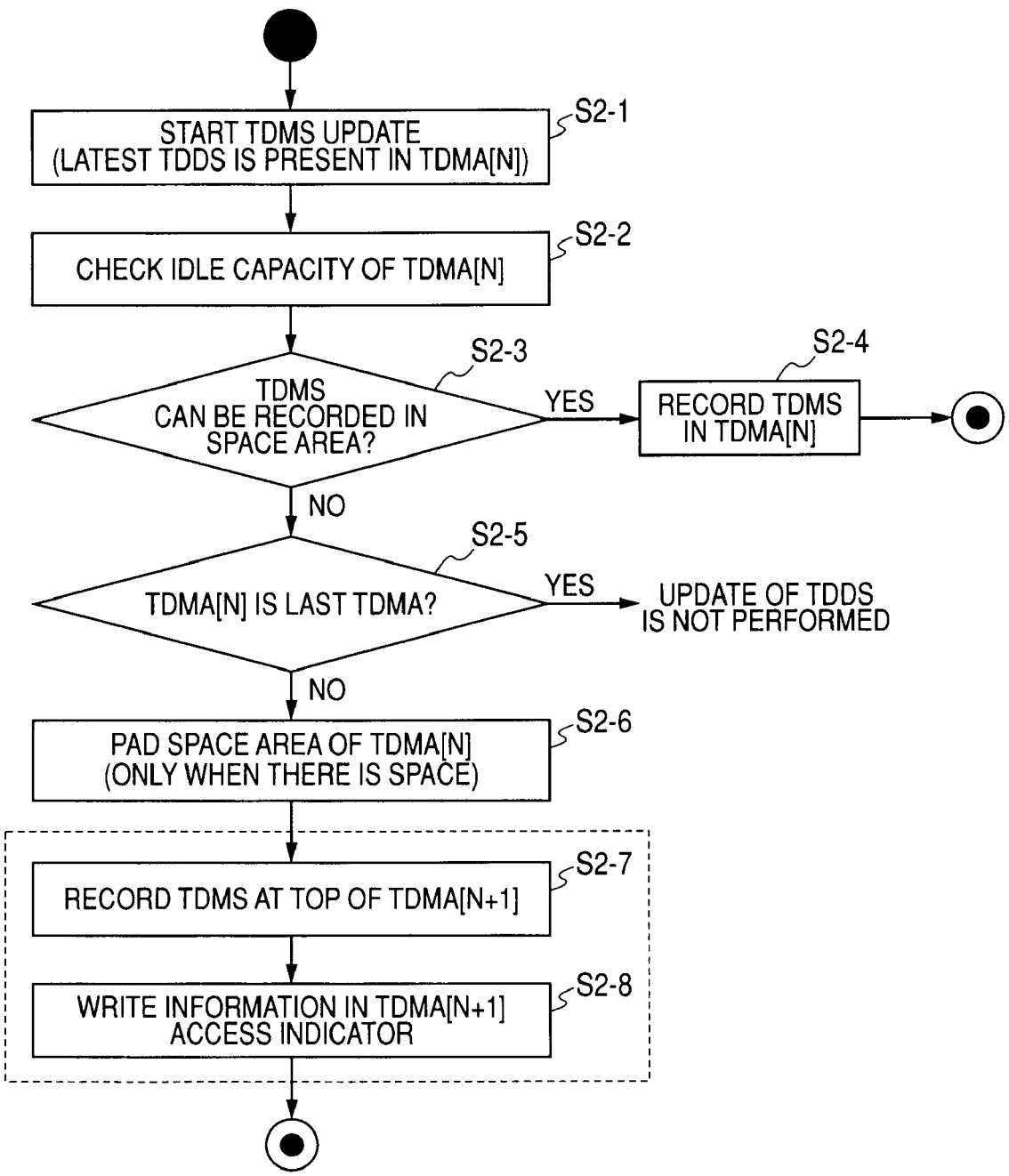
FIG. 19 is a flowchart for explaining indicator recording processing (in the case of indicator later writing) in the past.

FIG. 19 shows indicator recording processing in the past in performing recording on the TDMA access indicator after recording in the TDMS in this way.

In FIG. 19, first, when update of the TDMS is started in step S2-1, the system controller 60 checks a space area of the TDMA[N] (S2-2) and determines whether the TDMS can be recorded in the space area (S2-3). In this case, the TDMA[N] indicates a TDMA in which a TDDS (TDMS) latest at that point is recorded. When it is determined in step S2-3 that the TDMS can be recorded, the system controller 60 records the TDMS in the TDMA[N] (S2-4).

When it is determined that the TDMS may not be able to be recorded, first, the system controller 60 determines whether the TDMA[N] is a last TDMA (i.e., in the case of a single-layer disc (SL), whether the TDMA[N] is the TDMA2) (S2-5). When the TDMA[N] is the last TDMA, the system controller 60 does not update the TDDS. When it is determined that the TDMA[N] is not the last TDMA, the system controller 60 pads an area of the TDMA[N] (S2-6).

After padding the space area of the TDMA[N], first, the system controller 60 records a TDMS at the top of a TDMA [N+1] (S2-7). Then, the system controller 60 writes information on a TDMA[N+1] access indicator (S2-8). In other words, the system controller 60 fills the TDMA[N+1] access indicator with thirty-two copies of a TDDS in the TDMS write-once recorded in step S2-7.

When information is written on the indicator as shown in FIG. 19, even if writing processing is suspended at the time of writing failure in the TDMA[N+1] access indicator, the TDMS has already been recorded in the TDMA[N+1]. Therefore, it is difficult to correctly represent correspondence between the indicator and the actual latest TDMA. Specifically, in the disc in that case, regardless of the fact that the latest TDMS is present in the TDMA[N+1], depending on the indicator, the latest TDMS is indicated as being present in the immediately preceding TDMA [N].

When writing on the indicator fails and the latest TDMA is shown by mistake, problems described below could occur when the disc recognition processing shown in FIG. 18 is performed.

First, when it is determined that the latest TDMA is present in the TDMA[N] regardless of the fact that the latest TDMA is present in the TDMA[N+1], the drive device operates to search for a last recorded address of the TDMA[N] and acquire a TDDS present in the last recorded address. However, in this case, it is extremely highly likely that the portion of the last recorded address of the TDMA [N] is padded with 0 data by padding. When the TDMA[N] is padded in this way, it is difficult for the drive device to acquire information for disc recognition. Therefore, in this case, it is difficult for the drive device to perform disc recognition itself.

Even if the TDMA[N] is not padded and the last recorded address of the TDMA[N] is an end address of the TDMA[N], the drive device acquires the wrong TDDS present in the last recorded address. Therefore, it is difficult to perform correct disc recognition.

7. Indicator Recording Processing According to this Embodiment

Therefore, in this embodiment, a recovery method performed when recording on the TDMA access indicator fails is proposed. In this embodiment, even when recording on an access indicator partially fails, a TDMA specified on the basis of a recording state of the access indicator and a TDMA in which latest management information is actually recorded are properly associated with each other.

For this purpose, operations described below are performed in this embodiment. According to information recording on the TDMA access indicator, it is determined whether the information recording is successful. When it id determined that the information recording fails, a latest TDMS is recorded in a TDMA in which a TDMS should be recorded following a TDMA corresponding to the TDMA access indicator on which the information recording fails. Then, information recording is performed on a TDMA corresponding to the TDMA in which the latest TDMS is recorded.

FIGS. 20A to 20D are diagrams for explaining such indicator recording processing according to this embodiment and schematically shows the TDMA0, the TDMA1, and the TDMA2 formed in the disc 1. Hatched portions in the figure represent recorded areas.

Figure 20:
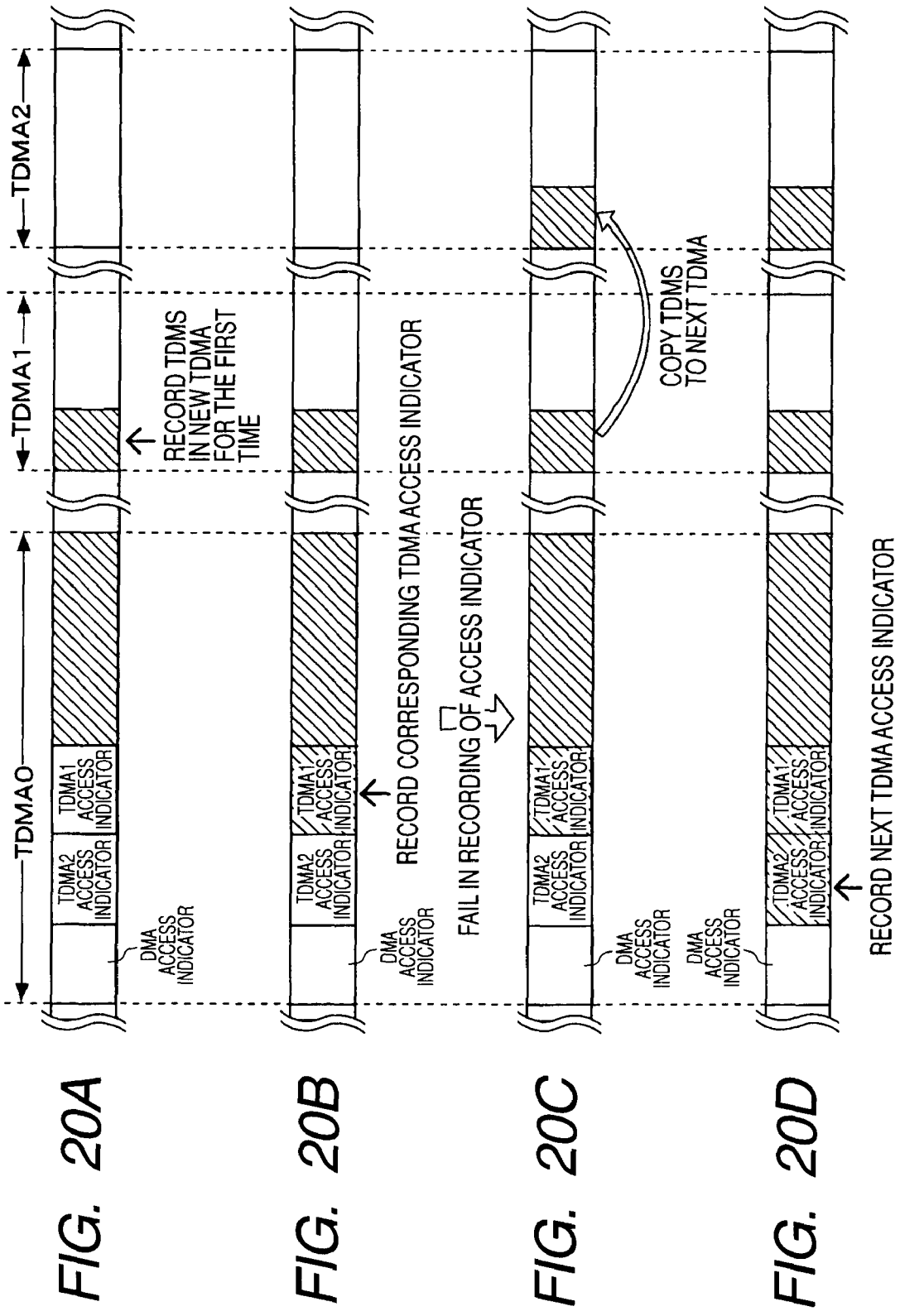
FIGS. 20A to 20D are diagrams for explaining indicator recording processing (indicator later writing) according to the embodiment.

First, as it is understood from the above explanation, information recording is performed on the TDMA access indicator when the TDMS is recorded in the TDMA after the TDMA1 for the first time. In FIG. 20A, as an example, there is no space area in the TDMS writing area in the TDMA0 and a TDMS is recorded anew at the top of the TDMA1.

In response to the first recording of the TDMS in the new TDMA shown in FIG. 20A, as shown in FIG. 20B, information recording (recording of a copy of a TDDS in the recorded TDMS) on the TDMA access indicator associated with the TDMA is performed. In other words, in the example of this case, in response to the first recording of the TDMS in the TDMA1, information recording is performed on the TDMA1 access indicator associated with the TDMA1.

According to the above explanation, in this embodiment, in response to information recording on the TDMA access indicator, it is determined whether the information recording is successful. When it is determined that the information recording fails, a latest TDMS is recorded in a TDMA in which the TDMS should be recorded following the TDMA corresponding to the TDMA access indicator on which the information recording fails. Then, information recording is performed on the TDMA access indicator corresponding to the TDMA in which the latest TDMS is recorded. In other words, in the example in this case, as shown as transition from FIG. 20C to FIG. 20D, the latest TDMS recorded in the TDMA1 is recorded (copied) in the TDMA2 and, then, information recording is performed on the TDMA2 access indicator corresponding to the TDMA2 in which the TDMS is recorded in this way (i.e., a TDMA access indicator next to the TDMA1 access indicator).

With the indicator recording processing according to this embodiment, even if recording of an access indicator corresponding to a certain TDMA fails, it is possible to properly indicate that latest management information is present in TDMAs after the TDMA. Consequently, even when recording on the access indicator partially fails, finally, it is possible to correctly show the TDMA in which latest management information is recorded.

As a result, it is possible to cause a reproduction side to correctly acquire latest management information and correctly perform information recognition concerning a recording medium.

According to the operations explained above, when information recording on the TDMA access indicator continues to fail, recording of the TDMS in the next TDMA and information recording on the TDMA access indicator corresponding to the TDMA is repeatedly performed. However, when information recording on the last TDMA access indicator fails, the remaining access indicator is only the DMA access indicator.

Therefore, when information recording on the last TDMA access indicator fails, recording of the latest TDMS (DMS) on the respective DMAs (DMA1 to DMA4) and information recording on the DMA access indicator are performed. In other words, the disc 1 is finalized.

A processing operation that should be performed in order to realize the indicator recording processing according to the embodiment explained above is explained with reference to a flowchart shown in FIG. 21. The structure of a disc drive device according to this embodiment is the same as that explained with reference to in FIG. 17. The processing operation shown in FIG. 21 is executed by the system controller 60 shown in FIG. 17 on the basis of programs stored in, for example, a built-in memory.

The processing operation shown in the figure is executed as processing instead of the processing in steps S2-7 and S2-8 surrounded by a broken line in the indicator recording processing in the past shown in FIG. 19. The processing operation shown in the figure is started when recording of the TDMS should be recorded in the next TDMA for the first time.

Figure 21:
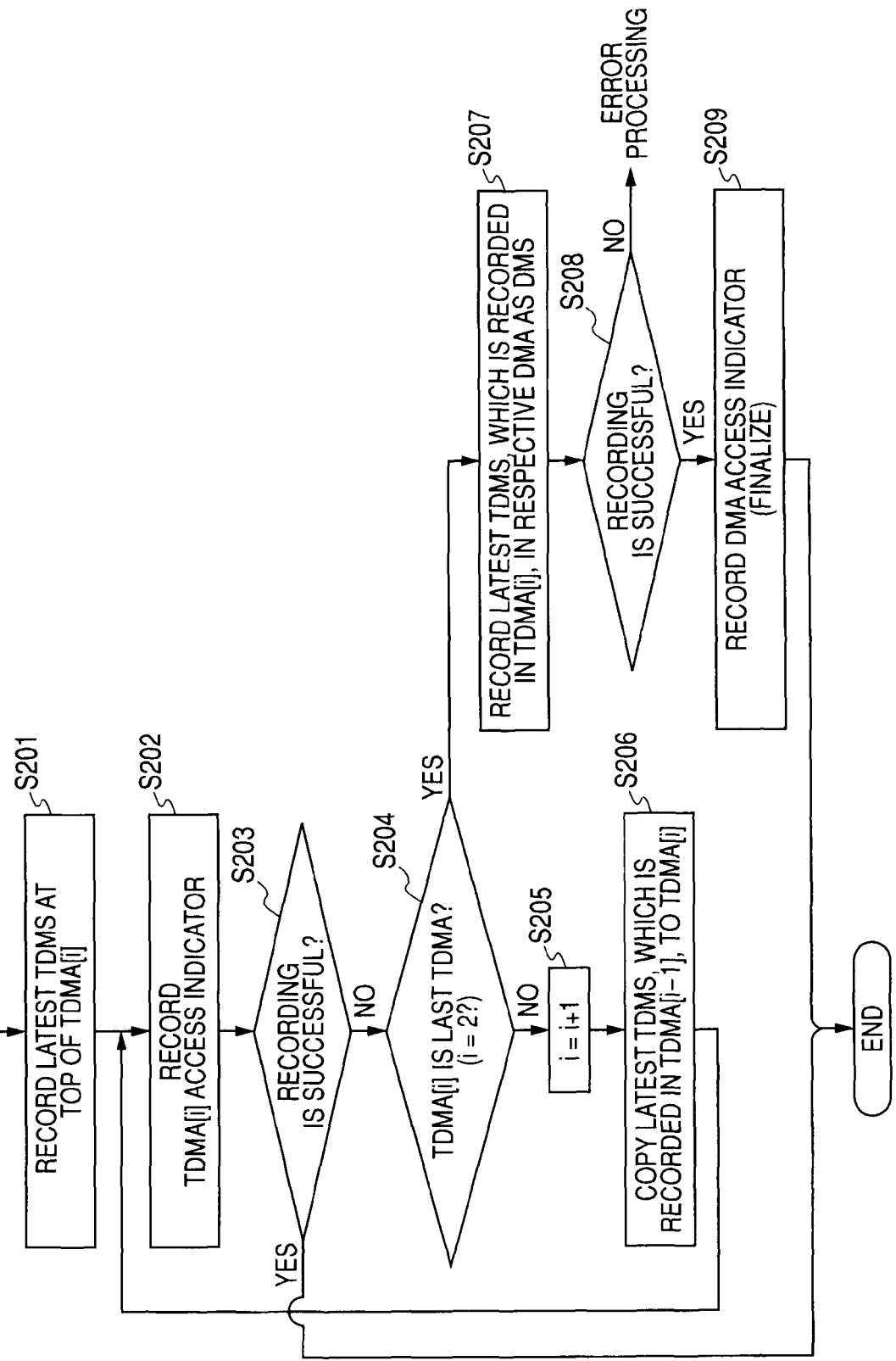
FIG. 21 is a flowchart showing a processing operation for realizing the indicator recording processing (indicator later writing) according to the embodiment.

In FIG. 21, first, in step S201, the system controller 60 executes processing for recording a latest TDMS at the top of a TDMA[i].

A value of [i] is the same as a value of [N+1] in step S2-7 (S2-8) shown in FIG. 19. In other words, a value of [i] is a numerical value representing a number of a TDMA in which a TDMS should be recorded anew.

As the processing in step S201, for example, the system controller 60 instructs the servo circuit 61 to move the optical pickup 51 to an address in which the latest TDMS should be written and supplies data as a TDMS to the modulation and demodulation circuit 56 to cause the modulation and demodulation circuit 56 to execute recording of the latest TDMS in the top of the TDMA[i].

In the following step S202, the system controller 60 executes processing for performing information recording on a TDMA[i] access indicator. In other words, in this case, as in the above case, for example, the system controller 60 gives instruction to the servo circuit 61 and supplies data to the modulation and demodulation circuit 56 (in this case, supply TDDS data in the latest TDMS) to cause the servo circuit 61 or the modulation and demodulation circuit 56 to record TDDSs (thirty-two TDDSs) in the TDMA[i] access indicator.

In the next step S203, the system controller 60 determines whether the information recording is successful. In other words, the system controller 60 performs, on the basis of a result obtained by performing verification concerning the inside of the TDMA[i] access indicator, determination processing for determining whether the information recording on the TDMA[i] access indicator is successful.

When it is determined that the information recording on the TDMA[i] access indicator is successful and an affirmative result is obtained in step S203, as shown in the figure, the indicator recording processing shown in the figure is finished.

On the other hand, when a negative result indicating that the information recording on the TDMA[i] access indicator is not successful (i.e., fails) is obtained in step S203, the system controller 60 proceeds to step S204 and determines whether the TDMA[i] is a last TDMA. Specifically, since this processing is performed on the premise that the disc 1 is a single-layer disc (SL), the system controller determines whether i is 2.

When it is determined that the TDMA[i] is not a last TDMA and a negative result is obtained in step S204, the system controller 60 proceeds to step S205, increments a value of i (i=i+1), and, then, in step S206, executes processing for copying a latest TDMS recorded in a TDMA[i−1] to the top of the TDMA[i]. Then, as shown in the figure, the system controller 60 returns to step S202 and executes processing for performing information recording on the TDMA[i] access indicator.

When the latest TDMS is recorded in the next TDMA in response to the failure in information recording on the TDMA access indicator in this way, in the TDMA corresponding to the TDMA access indicator on which the information recording fails, the TDMS is recorded only at the top of the TDMA and the remaining portion is a space area. Therefore, processing for padding the space area may be performed. Specifically, for example, processing for padding a space area of the TDMA[i−1] is inserted between steps S205 and S206.

When it is determined that the TDMA[i] is the last TDMA and an affirmative result is obtained in step S204, the system controller 60 proceeds to step S207 and executes processing for recording the latest TDMS, which is recorded in the TDMA[i], in each of the DMAs as a DMS.

In the following step S208, the system controller 60 determines whether the recording in the DMA is successful. In other words, the system controller 60 performs, on the basis of a result of verifying a result of the recording of the DMS in each of the DMAs, processing for determining whether recording of the DMS in each of the DMAs is successful.

When it is determined that the recording fails and a negative result is obtained in step S208, as shown in the figure, the system controller 60 executes error processing. For example, the system controller 60 only has to execute processing for notifying the host apparatus 120 that an error has occurred.

When it is determined that the recording is successful and an affirmative result is obtained in step S208, the system controller 60 proceeds to step S209 and executes processing for performing information recording on the DMA access indicator. In other words, the system controller 60 executes processing for recording, on the DMA access indicator, a DDS which is based on a TDDS in the latest TDMS. That is, finalization of the disc 1 is completed thereby.

In the example explained above, the disc 1 is a single-layer disc (SL). However, the present invention can be suitably applied to discs including two or more discs.

Figure 22:
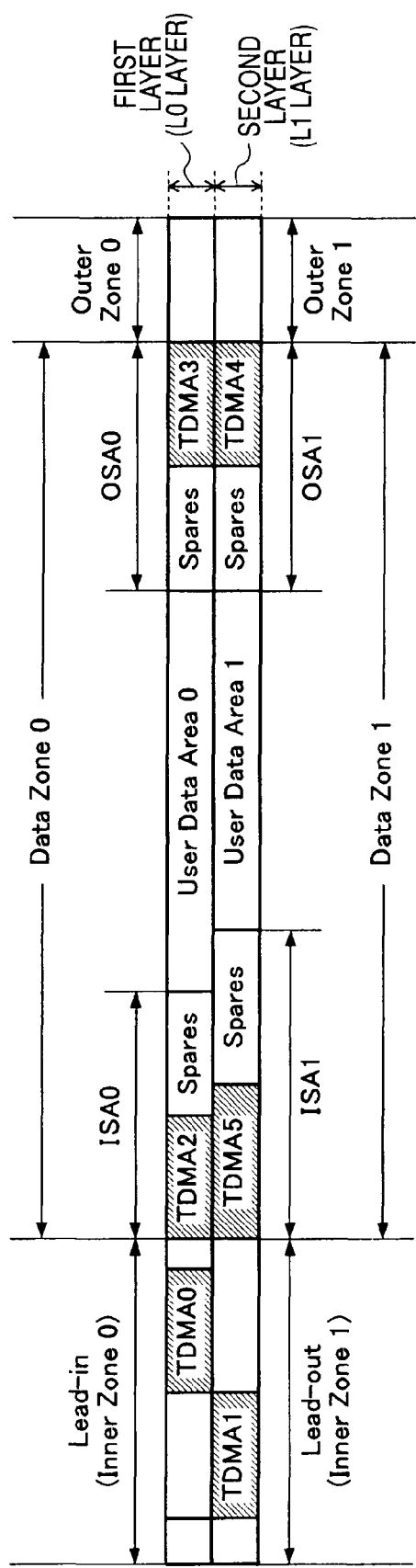
FIG. 22 is a flowchart for explaining an example of the area structure of a dual-layer disc.

FIG. 22 shows the area structure of a dual-layer disc (DL: Dual Layer).

As shown in the figure, in the case of the DL, the area structure of a first layer is substantially the same as the area structure of the SL except that the read-out area is not formed. However, in this case, the data zone is represented as a "Data Zone 0" in order to distinguish the data zone from a data zone of a second layer. The inner spare area (ISA) and the outer spare area (OSA) in the data zone are represented as an "ISA0" and "OSA0" in order to distinguish those in the second layer.

In this case, since recording directions in the first layer and the second layer are different, a portion further on an outer circumferential side than the data zone is an interlayer turning portion. As shown in the figure, the turning portion is referred to as outer zone (Outer Zone). The outer zone in the first layer is an "Outer Zone 0" and the outer zone in the second layer is an "Outer Zone 1".

The data zone in the second layer is represented as a "Data Zone 1". The outer spare area in the second layer is an "OSA1" and an inner spare area in the second layer is an "ISA1". An area further on an inner circumferential side than the data zone of the second layer is set as a read-out area. As shown in the figure, an area further on an inner circumferential side than the data area in which the read-in area is formed in the first layer is referred to as "Inner Zone 0". An area further on an inner circumferential side than the data area in which the read-out area is formed in the second layer is referred to as "Inner Zone 1".

As TDMAs in the case of the DL, as shown in the figure, the fixed TDMA0 is provided in the read-in area and the fixed TDMA1 is provided in the read-out area. In other words, two fixed TDMAs are provided in total, each provided in each of the layers. As other TDMAs, one TDMA can be set in the inner spare area in each of the first and second layers and one TDMA can be set in the outer spare are in each of the first and second layer. In this case, as in the above case, in each of the TDMAs in the data zones, only one of a start address and an end address is fixed and a size thereof is variable. As shown in the figure, the TDMA in the inner spare area (ISA0) of the first layer is represented as a TDMA2 and the TDMA in the outer spare area (OSA0) of the first layer is represented as a TDMA3. The TDMA in the outer spare area (OSA1) of the second layer is represented as a TDMA4 and the TDMA in the inner spare area (ISA1) of the second layer is represented as a TDMA5.

In this way, in the case of the DL, maximum six TDMAs can be provided.

Figure 23:
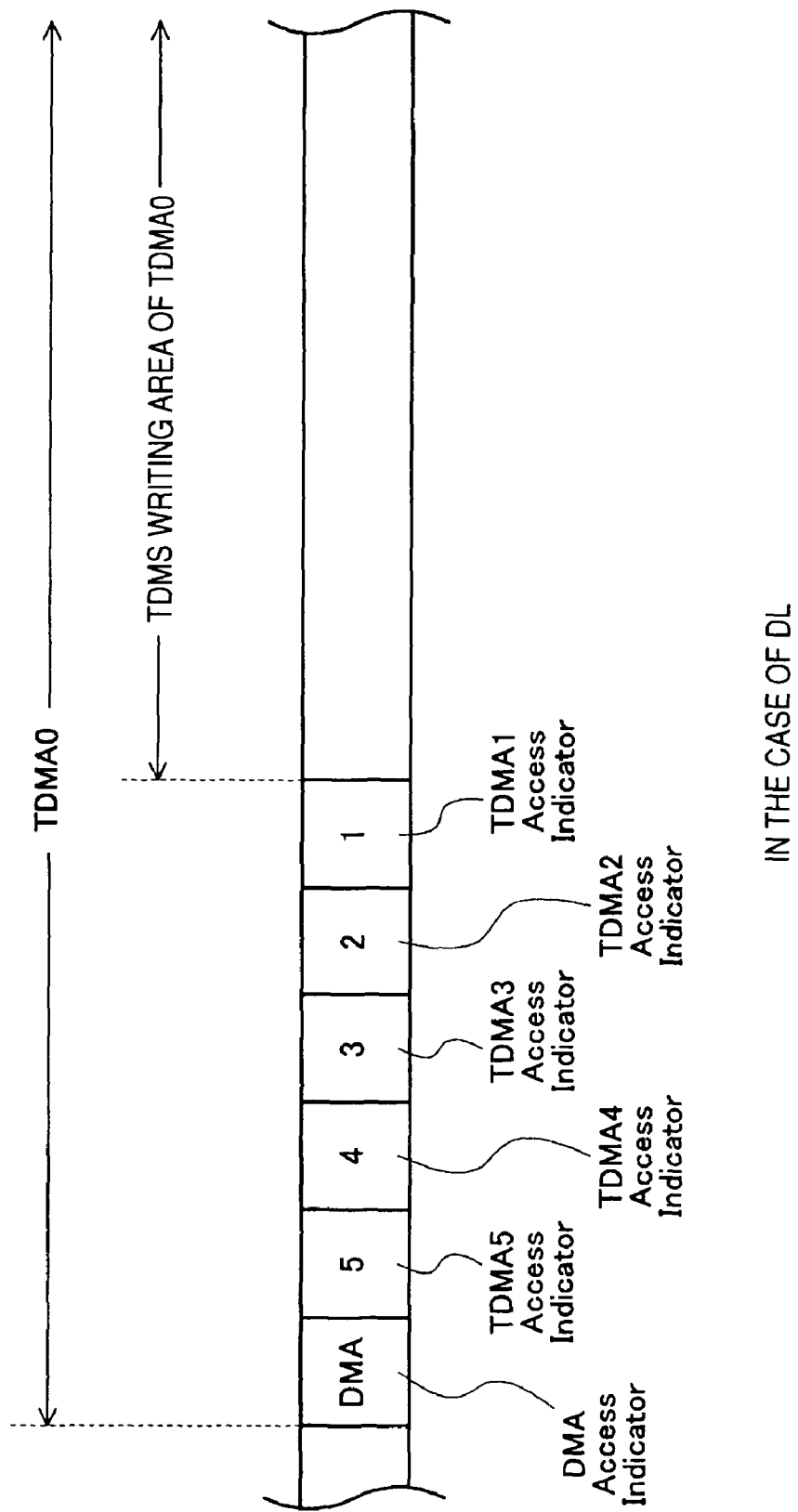
FIG. 23 is a diagram showing an example of the structure of the TDMA0 of the dual-layer disc.

In the case of the DL, the access indicator in the TDMA0 is changed to the structure shown in FIG. 23 to be associated with the area structure shown in FIG. 22.

In FIG. 23, in this case, as in the above case, the access indicator is provided in the top area of the TDMA0. However, in this case, five access indicators are provided as TDMA access indicators after the DMA access indicator in the top one cluster. As shown in the figure, one cluster (a second cluster) after the DMA access indicator is set as a TDMA5 access indicator, a third cluster is set as a TDMA4 access indicator, a fourth cluster is set as a TDMA3 access indicator, a fifth cluster is set as a TDMA2 access indicator, and a sixth cluster is set as a TDMA1 access indicator.

In this case, treatment of the respective TDMA access indicators is the same as that in the case of the SL. When the TDMS update unit is written in the TDMA[n] after the TDMA0 for the first time, the TDMA[n] access indicator is filled with copies of a TDDS in an added TDMS.

In the case of such a DL, as indicator recording processing, in determining whether the TDMA[i] is the last TDMA in the processing in step S204 in FIG. 21, the system controller 60 only has to determine whether i is 5.

The example is explained above on the premise that, after a TDMS is recorded in a TDMA, information recording on a TDMA access indicator corresponding to the TDMA is performed (i.e., information is written on the indicator later). However, in the standard of the BD-R, timing for recording information on the TDMA access indicator is not specifically defined.

Therefore, in the following explanation, indicator recording processing in writing information on the TDMA access indicator earlier is explained.

Figure 24:
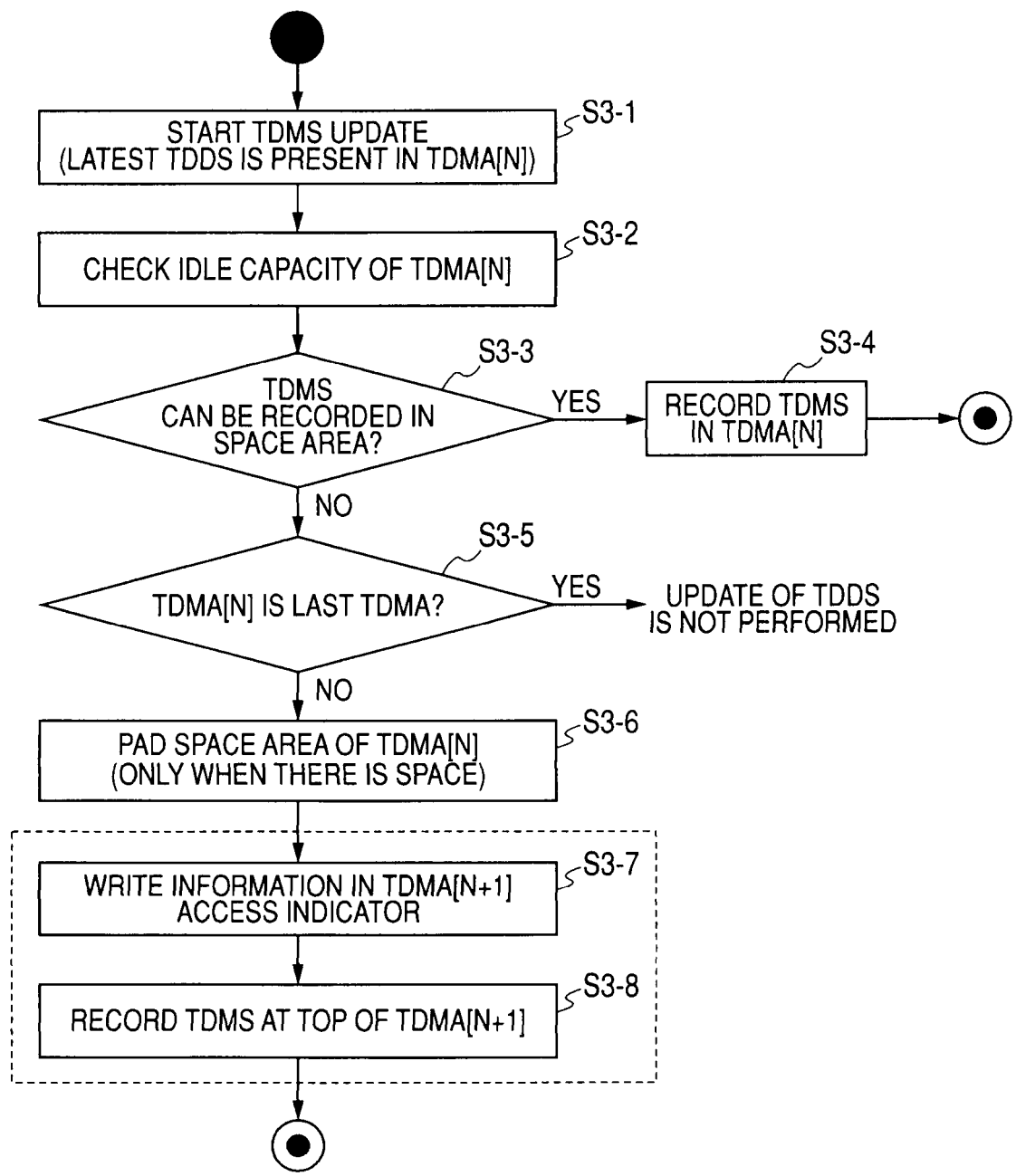
FIG. 24 is a flowchart for explaining indicator recording processing (in the case of indicator earlier writing) in the past.

FIG. 24 shows indicator recording processing in the past based on the premise that information is written on a TDMA access indicator earlier.

In this case, a series of processing (step S3-1 to S3-6) from checking of an idle capacity of a TDMA [N] latest at that point to padding of a space area of the TDMA[N] is the same as the processing in steps S2-1 to S2-6 shown in FIG. 19.

In the case of FIG. 24, after padding the space area of the TDMA[N], first, the system controller 60 performs information writing on a TDMA[N+1] access indicator (S3-7). Since content of a TDMS that should be recorded next is known on the drive device side, a TDDS in the TDMS is written on the TDMA[N+1] access indicator.

Thereafter, the TDMS is recorded at the top of the TDMA [N+1].

When information is written on the indicator shown in FIG. 24 earlier, it is likely that, even if writing on the TDMA[N+1] access indicator fails, processing for writing the TDMS in the TDMA[N+1] is executed. In this case, as in the above case, regardless of whether the latest TDMS is present in the TDMA[N+1], depending on the indicator in this case, it is indicated that the latest TDMS is present in the immediately preceding TDMA[N]. In other words, it is difficult to cause the reproduction side to perform correct disc recognition.

In order to make it possible to recover from a failure in recording on the TDMA access indicator based on the premise that information is written on an indicator earlier as described above, indicator recording processing according to this embodiment can be performed as described below.

In this case, as in the above case, in response to information recording performed on the TDMA access indicator, the system controller 60 determines whether the information recording is successful. When it is determined that the information recording fails, the system controller 60 performs information recording on a TDMA access indicator next to the TDMA access indicator on which the information recording fails. When the information recording is successful, the system controller 60 records latest management information in a TDMA corresponding to the TDMA access indicator on which the information recording is successful.

Figures 25A, 25B, 25C:
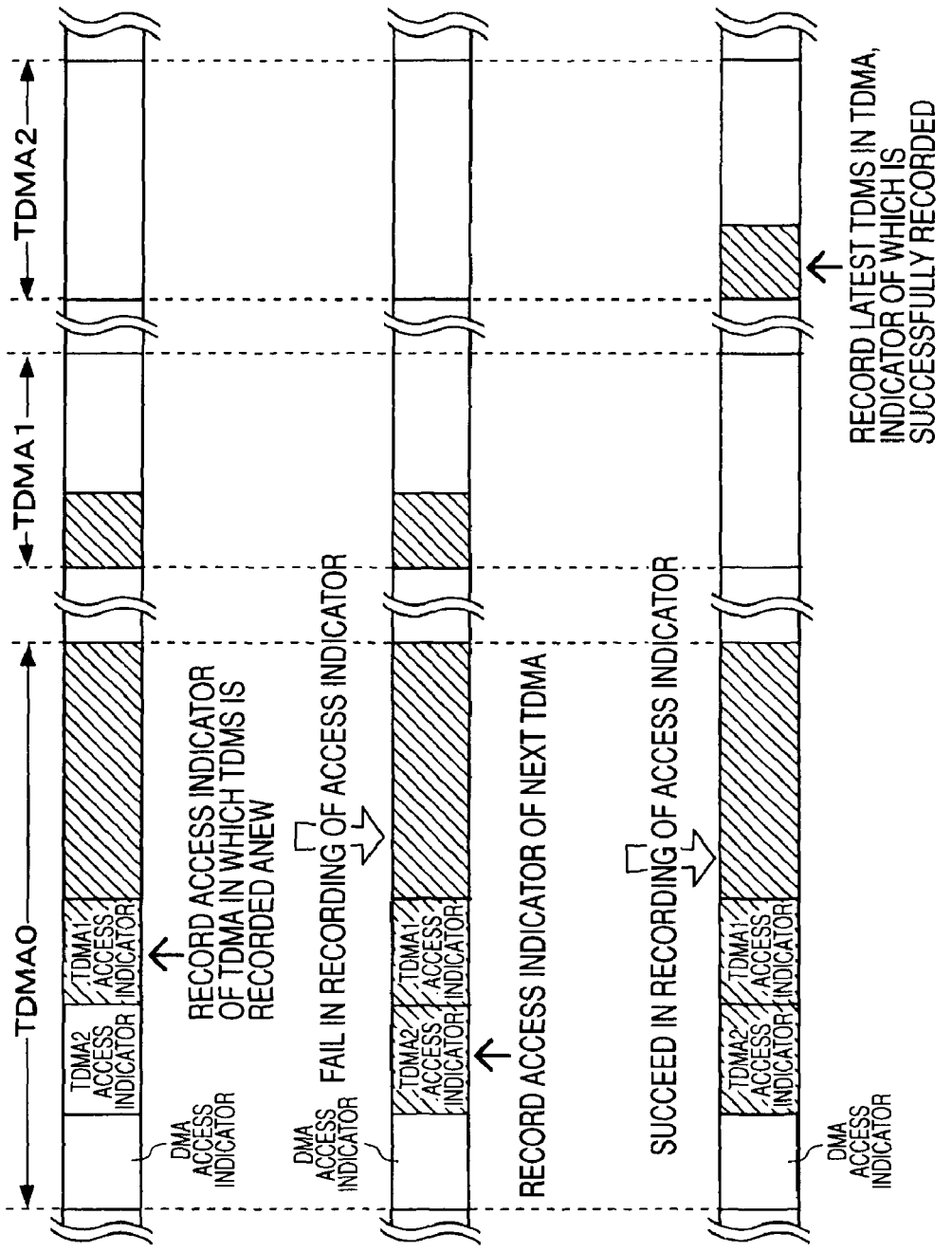
FIGS. 25A to 25C are diagrams for explaining indicator recording processing (indicator earlier writing) according to the embodiment.

FIGS. 25A to 25C are diagrams for explaining indicator recording processing according to this embodiment based on the premise that information is written on an indicator earlier.

In FIGS. 25A to 25C, as in FIGS. 20A to 20D, the TDMA0, the TDMA1, and the TDMA2 formed on the disc 1 are schematically shown. In this case, as in the above case, hatched portions in the figure represent recorded areas.

In FIGS. 25A to 25C, as an example, operations after no space area is left in the TDMS writing area in the TDMA0 and a TDMS should be recorded in the TDMA1 for the first time are shown. When a certain TDMA is exhausted for update and a TDMS should recorded in the next new TDMA for the first time, in response to this, first, as shown in FIG. 25A, information recording on a TDMA access indicator associated with the TDMA is performed. In the example shown in the figure, when the TDMS should be recorded in the TDMA1 for the first time, in response to this, information recording is performed on the TDMA1 access indicator.

According to the explanation of the operations, in response to information recording performed on the TDMA access indicator in this way, it is determined whether the information recording is successful. When it is determined that the information recording fails, information recording on a TDMA access indicator next to the TDMA access indicator on which the information recording fails is performed. In other words, in this case, information recording on the TDMA2 access indicator is performed as shown in FIG. 25B.

When it is determined that the information recording is successful, latest management information is recorded on a TDMA corresponding to the TDMA access indicator on which the information recording is successful. When information recording on the TDMA2 access indicator shown in FIG. 25B is successful, as shown in FIG. 25C, a latest TDMS is recorded at the top of the TDMA2 corresponding to the TDMA2 access indicator.

By performing such operations, even when recording on an access indicator corresponding to a certain TDMA based on the premise that information is written on an indicator earlier fails, it is possible to correctly indicate that latest management information is present in a TDMA next to the TDMA and subsequent TDMAs. In other words, in this case, as in the above case, even if recording on an access indicator partially fails, finally, it is possible to properly indicate a TDMA in which latest management information is recorded. As a result, it is possible to cause the reproduction side to correctly acquire the latest management information and correctly perform information recognition concerning a recording medium.

Figure 26:
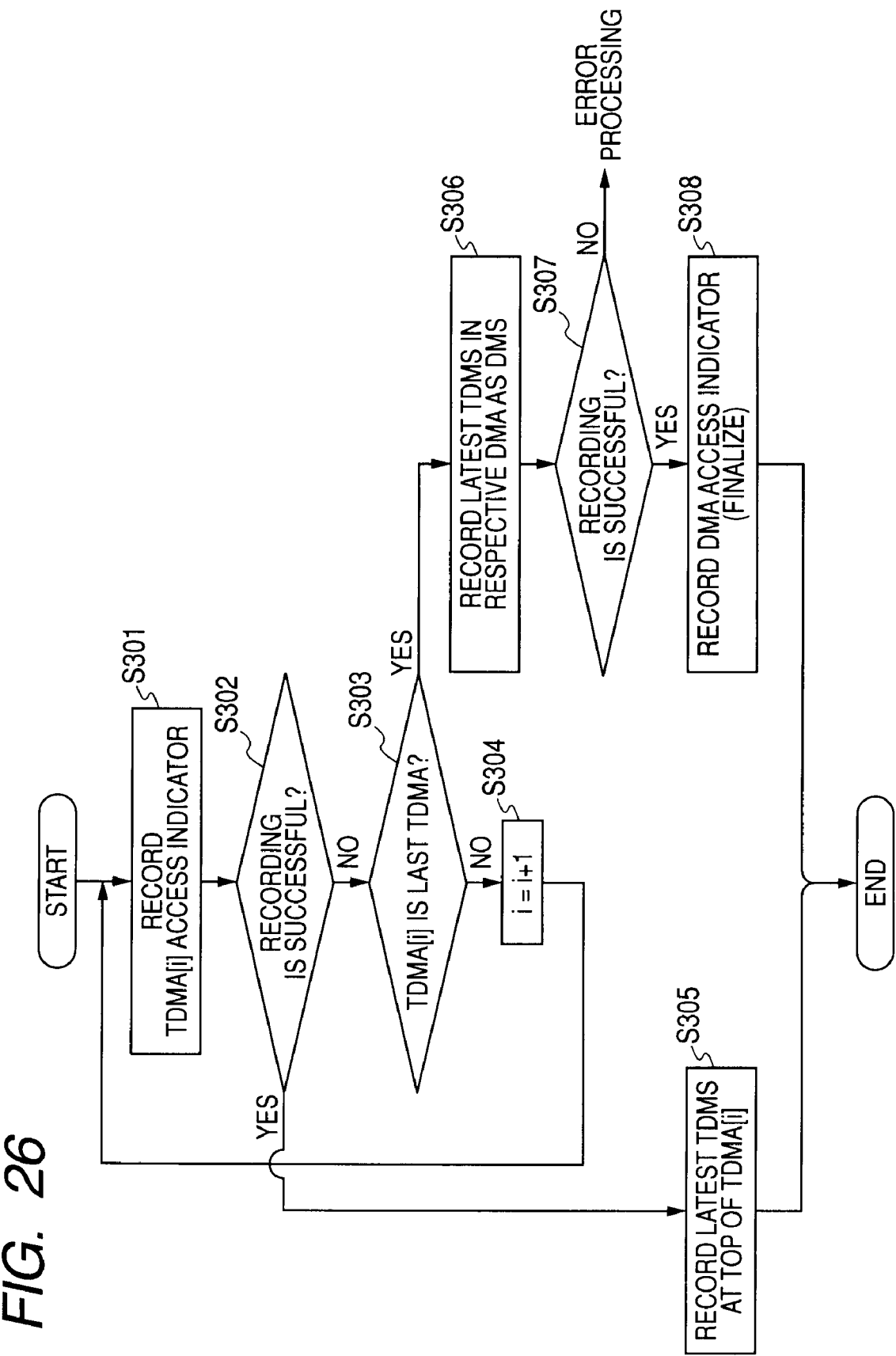
FIG. 26 is a flowchart for explaining a processing operation for realizing the indicator recording processing (indicator earlier writing) according to the embodiment.

A flowchart in FIG. 26 shows a processing operation that should be execute in order to realize the operations based on the premise that information is written on an indicator earlier.

The processing operation shown in FIG. 26 is also executed by the system controller 60 shown in FIG. 17 on the basis of a program stored in the memory or the like built therein.

The processing operation shown in the figure is executed as processing instead of the processing in steps S3-7 and S3-8 surrounded by a broken line in the indicator recording processing in the past shown in FIG. 24. A value of "i" in FIG. 26 indicates a value of "N+1" shown in FIG. 24, i.e., a numerical value representing a number of a TDMA in which a TDMS should be recorded anew.

In FIG. 26, first, in step S301, the system controller 60 executes processing for performing information recording on the TDMA[i] access indicator. In the following step S302, the system controller 60 determines whether the information recording is successful.

When it is determined that the information recording is successful and an affirmative result is obtained in step S302, as shown in the figure, the system controller 60 proceeds to step S305, records a latest TDMS at the top of the TDMA[i], and, then, finishes the indicator recording processing shown in the figure.

When it is determined that the information recording is not successful (fails) and a negative result is obtained in step S302, the system controller 60 proceeds to step S303 and determines whether the TDMA[i] is a last TDMA. Specifically, when the disc 1 is an SL, the system controller 60 determines whether i is 2. When the disc 1 is a DL, the system controller 60 determines whether i is 5.

When it is determined that the TDMA[i] is not the last TDMA and a negative result is obtained in step S303, the system controller 60 proceeds to step S304, increments the value of (i=i+1), and, then, returns to step S301. Consequently, information recording on the next TDMA access indicator is performed.

When it is determined that the TDMA[i] is the last TDMA and an affirmative result is obtained in step S303, the system controller 60 executes processing in step S306 and subsequent steps (S306, S307, and S308) as processing for finalizing the disc 1. The processing in steps S306 to S308 is the same as the processing in steps S207 to S209 shown in FIG. 21. This processing is different from the processing shown in FIG. 21 in that the latest TDMS used in step S306 is not recorded in the TDMA[i].

In the example explained above, all the TDMAs allowed under the standard are set. However, for example, in the case of the SL, it is also possible that sizes of the TDMA1 and the TDMA2 are set to 0. In other words, it is also possible that a size of the TDMA1 is set to 0 and update of management information is performed in order of the TDMA0 and the TDMA2. In the case of the DL, it is also possible that sizes of the TDMA2 to the TDMA5 are set to 0 and update of management information is performed by skipping the TDMAs having the size 0.

When it is assumed that the sizes of the TDMAs are set to 0, for example, indicator recording processing is performed on the premise that information is written on an indicator later. In this case, when a latest TDMS is recorded in the next TDMA in response to failure in information recording on a TDMA access indicator, the system controller checks whether a size of the next TDMA is 0. When the size is not 0, the system controller 60 records the latest TDMS in the next TDMA. On the other hand, when the size is 0, the system controller 60 checks whether sill the next TDMA is present (i.e., the next TDMA is a last TDMA). When still the next TDMA is present, the system controller 60 checks whether a size of the TDMA is 0. In this way, the system controller 60 repeatedly checks whether a size of a TDMA is 0 and, when the size is 0, checks whether a size of the next TDMA is 0. The system controller 60 records a TDMS at the top of only the TDMA, the size of which is determined not 0.

When indicator recording processing is performed based on the premise that information is written on an indicator earlier, in performing information recording on the next TDMA access indicator in response to failure in information recording on a TDMA access indicator, the system controller 60 checks whether a size of a TDMA corresponding to the next TDMA access indicator is 0. When the size is not 0, the system controller 60 performs information recording on the next TDMA access indicator. On the other hand, when the size is 0, the system controller 60 checks whether still the next TDMA is present (i.e., whether the next TDMA is a last TDMA). When still the next TDMA is present, the system controller 60 checks whether a size of the TDMA is 0. In this way, the system controller 60 repeatedly checks whether a size of a TDMA is 0 and, when the size is 0, checks whether a size of the next TDMA is 0. The system controller 60 performs information recording on a TDMA access indicator of only the TDMA, the size of which is determined not 0.

Consequently, the present invention is applicable even when a size of a TDMA is set to 0.

The embodiment of the present invention has been explained. However, the present invention should not be limited to the specific examples explained above.

For example, in the example explained above, the present invention is applied to the write-once medium. However, the present invention can be suitably applied to a rewritable medium.

In the example explained above, the present invention is applicable to the disc-like recording medium. However, the present invention can be suitably applied to recording media having shapes other than the disc shape. In that case, effects same as those in the embodiment can be obtained.

When a recording medium includes a user-data recording area in which user data can be recorded, a first temporary-management-information recording area in which temporary management information, which should be updated according to the data recording in the user-data recording area, is sequentially recorded, one or plural second temporary-management-information recording areas in which, when the first temporary-management-information recording area is exhausted for update of the temporary management information, the temporary management information is sequentially recorded, and area-use-state presenting areas that are provided in association with the respective second temporary-management-information recording areas and present states of use of the respective second temporary-management-information recording areas according to presence or absence of the information writing, the present invention can be suitably applied to the recording medium.

In the example explained above, the disc drive device according to the embodiment is connected to the host apparatus. However, the disc drive device may not be connected to other apparatuses. In that case, an operation unit and a display unit are provided and the structure of an interface section for data input and output is different from that shown in FIG. 17. In other words, recording and reproduction only have to be performed according to user operation and a terminal unit for input and output of various data only has to be formed.

In the example explained above, the recording apparatus according to the embodiment is the recording and reproducing apparatus that can perform reproduction as well. However, it goes without saying that the recording apparatus can be a recording-only apparatus that does not have a reproducing function.

It should be understood by those skilled in the art that various modifications, combinations, sub-combinations, and alterations may occur depending on design requirements and other factors insofar as they are within the scope of the appended claims or the equivalents thereof.

What is claimed is:

1. A recording apparatus that performs at least recording on a recording medium including a user-data recording area in which user data can be recorded, a first temporary-management-information recording area in which temporary management information, which should be updated according to the data recording in the user-data recording area, is sequentially recorded, one or plural second temporary-management-information recording areas in which, when the first temporary-management-information recording area is exhausted for update of the temporary management information, the temporary management information is sequentially recorded, and area-use-state presenting areas that are provided in association with the respective second temporary-management-information recording areas and present states of use of the respective second temporary-management-information recording areas according to presence or absence of the information writing, the recording apparatus comprising:

recording means for performing the recording on the recording medium; and controlling means for controlling the recording means, wherein the controlling means determines, in response to information recording in the area-use-state presenting area, whether the information recording is successful and controls, when it is determined that the information recording fails, the recording means to record the temporary management information in the second temporary-management-information recording area in which the temporary management information should be recorded following the second temporary-management-information recording area corresponding to the area-use-state presenting area in which the information recording fails and, then, perform information recording in the area-use-state presenting area associated with the second temporary-management-information recording area in which the temporary management information is recorded.

2. A recording apparatus according to claim 1, wherein the controlling means controls the recording means to execute finalization processing when it is determined that the second temporary-management-information recording area in which the temporary management information should be recorded is not present.

3. A recording method of performing at least recording on a recording medium including a user-data recording area in which user data can be recorded, a first temporary-management-information recording area in which temporary management information, which should be updated according to the data recording in the user-data recording area, is sequentially recorded, one or plural second temporary-management-information recording areas in which, when the first temporary-management-information recording area is exhausted for update of the temporary management information, the temporary management information is sequentially recorded, and area-use-state presenting areas that are provided in association with the respective second temporary-management-information recording areas and present states of use of the respective second temporary-management-information recording areas according to presence or absence of the information writing, the recording method comprising the steps of:

determining, in response to information recording in the area-use-state presenting area, whether the information recording is successful; and recording, when it is determined that the information recording fails, the temporary management information in the second temporary-management-information recording area in which the temporary management information should be recorded following the second temporary-management-information recording area corresponding to the area-use-state presenting area in which the information recording fails and, then, performing information recording in the area-use-state presenting area associated with the second temporary-management-information recording area in which the temporary management information is recorded.

4. A recording apparatus that performs at least recording on a recording medium including a user-data recording area in which user data can be recorded, a first temporary-management-information recording area in which temporary management information, which should be updated according to the data recording in the user-data recording area, is sequentially recorded, one or plural second temporary-management-information recording areas in which, when the first temporary-management-information recording area is exhausted for update of the temporary management information, the temporary management information is sequentially recorded, and area-use-state presenting areas that are provided in association with the respective second temporary-management-information recording areas and present states of use of the respective second temporary-management-information recording areas according to presence or absence of the information writing, the recording apparatus comprising:

recording means for performing the recording on the recording medium; and controlling means for controlling the recording means, wherein the controlling means determines, in response to information recording in the area-use-state presenting area, whether the information recording is successful, controls, when it is determined that the information recording fails, the recording means to perform the information recording in the area-use-state presenting area following the area-use-state presenting area in which the information recording fails, and controls, when it is determined that the information recording is successful, the recording means to record the temporary management information in the second temporary-management-information recording area corresponding to the area-use-state presenting area in which the information recording is successful.

5. A recording apparatus according to claim 4, wherein the controlling means controls the recording means to execute finalization processing when it is determined that the next area-use-state presenting area is not present.

6. A recording method of performing at least recording on a recording medium including a user-data recording area in which user data can be recorded, a first temporary-management-information recording area in which temporary management information, which should be updated according to the data recording in the user-data recording area, is sequentially recorded, one or plural second temporary-management-information recording areas in which, when the first temporary-management-information recording area is exhausted for update of the temporary management information, the temporary management information is sequentially recorded, and area-use-state presenting areas that are provided in association with the respective second temporary-management-information recording areas and present states of use of the respective second temporary-management-information recording areas according to presence or absence of the information writing, the recording method comprising the steps of:

determining, in response to information recording in the area-use-state presenting area, whether the information recording is successful; and performing, when it is determined that the information recording fails, the information recording in the area-use-state presenting area following the area-use-state presenting area in which the information recording fails and recording, when it is determined that the information recording is successful, the temporary management information in the second temporary-management-information recording area corresponding to the area-use-state presenting area in which the information recording is successful.

7. A recording apparatus that performs at least recording on a recording medium including a user-data recording area in which user data can be recorded, a first temporary-management-information recording area in which temporary management information, which should be updated according to the data recording in the user-data recording area, is sequentially recorded, one or plural second temporary-management-information recording areas in which, when the first temporary-management-information recording area is exhausted for update of the temporary management information, the temporary management information is sequentially recorded, and area-use-state presenting areas that are provided in association with the respective second temporary-management-information recording areas and present states of use of the respective second temporary-management-information recording areas according to presence or absence of the information writing, the recording apparatus comprising:

a recording unit configured to perform the recording on the recording medium; and a controlling unit configured to control the recording unit, wherein the controlling unit determines, in response to information recording in the area-use-state presenting area, whether the information recording is successful and controls, when it is determined that the information recording fails, the recording unit to record the temporary management information in the second temporary-management-information recording area in which the temporary management information should be recorded following the second temporary-management-information recording area corresponding to the area-use-state presenting area in which the information recording fails and, then, perform information recording in the area-use-state presenting area associated with the second temporary-management-information recording area in which the temporary management information is recorded.

8. A recording apparatus that performs at least recording on a recording medium including a user-data recording area in which user data can be recorded, a first temporary-management-information recording area in which temporary management information, which should be updated according to the data recording in the user-data recording area, is sequentially recorded, one or plural second temporary-management-information recording areas in which, when the first temporary-management-information recording area is exhausted for update of the temporary management information, the temporary management information is sequentially recorded, and area-use-state presenting areas that are provided in association with the respective second temporary-management-information recording areas and present states of use of the respective second temporary-management-information recording areas according to presence or absence of the information writing, the recording apparatus comprising:

a recording unit configured to perform the recording on the recording medium; and a controlling unit configured to control the recording unit, wherein the controlling unit determines, in response to information recording in the area-use-state presenting area, whether the information recording is successful, controls, when it is determined that the information recording fails, the recording unit to perform the information recording in the area-use-state presenting area following the area-use-state presenting area in which the information recording fails, and controls, when it is determined that the information recording is successful, the recording unit to record the temporary management information in the second temporary-management-information recording area corresponding to the area-use-state presenting area in which the information recording is successful.

* * * * *